(12) United States Patent
Osakabe et al.

(10) Patent No.: US 7,758,460 B2
(45) Date of Patent: Jul. 20, 2010

(54) CARRIAGE DRIVING APPARATUS AND IMAGE READING APPARATUS AND IMAGE RECORDING APPARATUS USING THE SAME

(75) Inventors: Yoshinori Osakabe, Seto (JP); Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 614 days.

(21) Appl. No.: 11/276,071

(22) Filed: Feb. 13, 2006

(65) Prior Publication Data

US 2006/0240924 A1    Oct. 26, 2006

(30) Foreign Application Priority Data

Feb. 14, 2005    (JP)    ............... 2005-036147

(51) Int. Cl.
G03G 15/00    (2006.01)
H04N 1/04    (2006.01)

(52) U.S. Cl. .................. 474/117; 474/101; 399/211

(58) Field of Classification Search ............. 474/101, 474/117; 399/211
See application file for complete search history.

(56) References Cited

U.S. PATENT DOCUMENTS 4,487,518 A * 12/1984 Enrini ................... 400/320
4,746,237 A * 5/1988 Takeda ................... 400/335
5,806,246 A * 9/1998 Azuma .................... 49/360
6,485,383 B1 * 11/2002 Hendricks et al. ........ 474/101
6,690,494 B1    2/2004 Yamada

FOREIGN PATENT DOCUMENTS

| JP | H574848 | 10/1993 |
|----|---------|---------|
| JP | H71786 | 1/1995 |
| JP | H8112956 | 5/1996 |
| JP | H10129069 | 5/1998 |
| JP | 2000 37921 | 2/2000 |
| JP | 2001 71577 | 3/2001 |

* cited by examiner

Primary Examiner—Robert A Siconolfi
Assistant Examiner—Stephen Bowes
(74) Attorney, Agent, or Firm—Baker Botts L.L.P.

(57) ABSTRACT

A carriage driving apparatus includes: a biaser which biases a pulley holder in a tensioning direction to tension a timing belt; and a biaser holder which holds the biaser such that the pulley holder is allowed to move to the slackening position when the biaser is not held by the biaser holder, and the pulley holder is biased by the biaser in the tensioning direction when the biaser is held by the biaser holder, the biaser holder limiting movement of the pulley holder in a slackening direction to slacken the timing belt, to a disengagement inhibit position between the slackening position and the tensioning position.

20 Claims, 17 Drawing Sheets

CARRIAGE DRIVING APPARATUS AND IMAGE READING APPARATUS AND IMAGE RECORDING APPARATUS USING THE SAME

INCORPORATION BY REFERENCE

The present application is based on Japanese Patent Application No. 2005-036147, filed on Feb. 14, 2005, the content of which is incorporated herein by reference.

BACKGROUND OF THE INVENTION

1. Field of the Invention

The invention relates to a carriage driving apparatus for reciprocating a carriage by a timing belt wound around a drive pulley and a driven pulley. The invention also relates to an image reading apparatus and an image recording apparatus including such a carriage driving apparatus.

2. Description of Related Art

As an image reading apparatus in a copy machine and a multifunction machine, there is known a flatbed scanner having a reading table in which is disposed a carriage on which an image sensor such as CCD (Charge Coupled Device) or CIS (Contact Image Sensor) is mounted in order to scan or read an image on a document placed on the reading table. As a carriage driving apparatus for reciprocating the carriage in such a flatbed scanner, there is known an apparatus where a timing belt is wound around a drive pulley mounted on an output shaft of a drive motor, and a driven pulley, and the carriage is coupled with the timing belt in order that rotation of the drive pulley is transmitted to the carriage via the timing belt, so that the carriage is slid on and along a guide shaft or the like. On the other hand, in an image recording apparatus, e.g., serial printer, such a carriage driving apparatus is used to reciprocate a carriage on which a recording head is mounted.

JP-A-2000-37921 discloses a conventional arrangement for supporting a driven pulley in a carriage driving apparatus, where a timing belt coupled with a carriage is wound around a drive pulley attached on an output shaft of a drive motor, and the driven pulley as attached to a bracket or a pulley holder of a machine incorporating the carriage driving apparatus. The pulley holder is displaceable along a guiding slot formed in a chassis frame, or a base, of the machine. In order to give a tensile force to the timing belt, the pulley holder is biased by a biaser in the form of a compression spring interposed between the pulley holder and a vertical part formed by cutting the base and bending the cut portion upward to stand. In the vicinity of the pulley holder, a stopper or a restrictor is screwed to the base in order to limit sliding movement of the pulley holder toward the drive pulley, that is, in a direction to slacken the timing belt or to the "slackening side". Thus, the timing belt is kept tense without slack, thereby ensuring the transmission of rotation of the drive pulley to the carriage via the timing belt.

As described above, the restrictor is screwed to the base in order to limit the sliding movement of the pulley holder, thereby preventing the timing belt from slacking to such a degree that the timing belt disengages from the driven pulley. However, this arrangement requires to screw the restrictor at a suitable position after the attachment of the pulley holder at the guiding slot, thereby requiring components such as the screw and the restrictor, as well as steps of assembling these components. The increase in the number of components and assembly steps pushes up the cost of the carriage driving apparatus.

In a case where components including the restrictor and the screw securing the restrictor are omitted, no problem occurs with the timing belt when the pulley holder is slid along the guiding slot in the direction to slacken the timing belt during a normal reading operation in which an image is read while the carriage is being reciprocated. However, when an impact is imposed on the carriage driving apparatus to displace the carriage by a large amount, during transportation of the machine or in other situations, the pulley holder may greatly slide in the direction to slacken the timing belt against the biasing force of the compression spring, resulting in disengagement of the timing belt from the driven pulley, or disengagement of the pulley holder from the guiding slot.

To prevent such an undesirable great movement of the carriage during transportation of the machine or in other situations, it has been proposed to dispose a retainer which temporarily fixes the carriage to the base of the machine. Temporarily fixing the carriage by means of the retainer is much meritorious particularly when the carriage driving apparatus is used in an image reading apparatus such as flatbed scanner that uses a CCD as the image sensor, since a weight of the carriage is increased by mounting on the carriage the CCD, which includes a reflecting mirror and others. However, employment of the CCD in the image reading apparatus is undesirable since the cost and size of the image reading apparatus increase.

A CIS that is smaller in size, more lightweight, and lower in cost than a CCD is suitably employed in an image reading apparatus when the size and cost of the image reading apparatus are desired to be small and low. A carriage on which a CIS is mounted is lightweight as compared to a carriage on which a CCD is mounted. However, when the carriage driving apparatus includes neither the restrictor that limits sliding movement of the pulley holder, nor the retainer that temporarily fixes the carriage to the base of the machine to prevent displacement of the carriage, the timing belt or the pulley holder may disengage during transportation of the machine or in other situations, as described above. When the retainer is employed for temporarily fixing the carriage to the base, the number of components and assembly steps increase, thereby pushing up the cost of the image reading apparatus, similarly to the case of the CCD.

SUMMARY OF THE INVENTION

The present invention has been developed in view of the above-described situations, and therefore it is an object of the invention to provide a carriage driving apparatus for reciprocating a carriage on which an image sensor, a recording head, or others is mounted, which apparatus is capable of preventing a timing belt from disengaging from a driven pulley, with a simple structure.

To attain the object, this invention provides a carriage driving apparatus for reciprocating, along a straight line, a carriage by a timing belt wound around at least a drive pulley and a driven pulley, the apparatus including: a pulley holder which holds the driven pulley such that the driven pulley is rotatable; a guide device which guides the pulley holder such that the pulley holder is movable at least between a slackening position where engagement and disengagement of the timing belt with and from the driven pulley is allowed, and a tensioning position where the timing belt is tensioned; a biaser which biases the pulley holder in a tensioning direction to tension the timing belt; and a biaser holder which holds the biaser such that the pulley holder is allowed to move to the slackening position when the biaser is not held by the biaser holder, and the pulley holder is biased by the biaser in the tensioning direction when the biaser is held by the biaser holder, the biaser holder limiting movement of the pulley holder in a slackening direction to slacken the timing belt, to a disengagement inhibit position between the slackening position and the tensioning position.

The pulley holder is movable, under guidance by the guide device, toward the tensioning position or in the tensioning direction to tension the timing belt, which may be referred to as "to the tensioning side", and toward the slackening position or in the slackening direction to slacken the timing belt, which may be referred to as "to the slackening side". The slackening position of the pulley holder is such that when the pulley holder is located at this position, the timing belt is allowed to be freely or naturally wound around or disengaged from, the driven pulley. The pulley holder is biased by the biaser held by the biaser holder to the tensioning side in order to tension, with an appropriate tensile force, the timing belt wound around the drive pulley and the driven pulley. Even where the pulley holder or other members deforms due to change in temperature or for other reasons, the pulley holder moves to the tensioning side or to the slackening side and the tensile force of the timing belt is kept constant, with a variation range of the biasing force of the biaser relatively small. Since the biaser holder limits the movement of the pulley holder toward the slackening position, to the disengagement inhibit position at most, even where the carriage greatly moves due to an impact, the pulley holder is inhibited from reaching the slackening position where the timing belt is naturally disengageable from the driven pulley, thereby preventing the timing belt from disengaging from the driven pulley. That is, the disengagement inhibit position of the pulley holder is such that when the pulley holder is located at this position, the timing belt does not naturally disengage from the driven pulley, unless intentionally disengaged by a user or others. In this way, it is enabled to prevent disengagement of the timing belt from the driven pulley with a simple structure.

The slackening position of the pulley holder is determined such that when the pulley holder is located at this position, the timing belt is allowed to be wound around or disengaged from the driven pulley without a tensile force acting on the timing belt. The disengagement inhibit position is determined such that when the pulley holder is located at this position, the timing belt does not disengage from the driven pulley unless a tensile force applied to the timing belt.

The invention also provides a carriage driving apparatus for reciprocating, along a straight line, a carriage by a timing belt wound around at least a drive pulley and a driven pulley, the apparatus including: a pulley holder which holds the driven pulley such that the driven pulley is rotatable; a guide device which guides the pulley holder such that the pulley holder is movable in a slackening direction which is a direction to slacken the timing belt, and a tensioning direction which is a direction to tension the timing belt; a biaser which biases the pulley holder in the tensioning direction; and a biaser holder which holds the biaser such that a further-movement limit position, at which the pulley holder is inhibited from further moving in the slackening direction, is located more on the tensioning side when the biaser is held by the biaser holder than when the biaser is not held by the biaser holder.

According to this arrangement, the biaser and the biaser holder are used to determine the limit of the movement of the pulley holder in the slackening direction, in order to reduce at least one of the number of components and the number of assembly steps. The thus determining the limit of movement of the pulley holder in the slackening direction can prevent, for instance, disengagement of the timing belt from the driven pulley as in the previously described carriage driving apparatus, or disengagement of the pulley holder from the guide device.

The invention further provides an image reading apparatus including: one of the above-described carriage driving apparatuses; the carriage; and an image reading head mounted on the carriage, and an image recording apparatus including: one of the carriage driving apparatuses; the carriage; and an image recording head mounted on the carriage.

In the image reading apparatus and the image recording apparatus, each of the carriage driving apparatuses constructed as described above makes it possible to prevent disengagement of the timing belt from the driven pulley, with a simple structure. Hence, the number of components of the image reading apparatus or the image recording apparatus as a whole can be reduced, and the efficiency of assembly of the image reading apparatus or the image recording apparatus is enhanced.

Each of the carriage driving apparatuses may be produced according to a method including: assembling the pulley holder to the guide device; winding the timing belt around the driven pulley held by the pulley holder, while the pulley holder is at the slackening position; and having the biaser holder hold the biaser after the winding of the timing belt, so that the pulley holder is biased in the tensioning direction by a biasing force of the biaser while inhibited from moving in the slackening direction further than the disengagement inhibit position.

Each of the carriage driving apparatuses may be produced according to another method including: assembling the pulley holder to the guide device; having the biaser holder hold the biaser such that the pulley holder biased in the tensioning direction by a biasing force of the biaser while inhibited from moving in the slackening direction further than the disengagement inhibit position; and winding the timing belt around the driven pulley, by applying a force in the tensioning direction to the timing belt while the pulley holder is held at the disengagement inhibit position against the biasing force of the biaser.

According to the former method, the timing belt is wound around the driven pulley prior to attachment of the biaser to the biaser holder.

On the other hand, according to the latter method, the biaser is first attached to the biaser holder, and then the timing belt is forcibly wound around the pulley holder with a relatively large tensile force applied to the timing belt in the tensioning direction while the pulley holder is held at the disengagement inhibit position. However, once the carriage driving apparatus is finished as a product, such a large tensile force in the tensioning direction that enables disengagement of the timing belt from the driven pulley is not naturally applied to the timing belt, unless intentionally applied by a user. Thus, disengagement of the timing belt from the driven pulley is prevented.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described presently preferred embodiments of the invention, by referring to the accompanying drawings.

Figure 1:
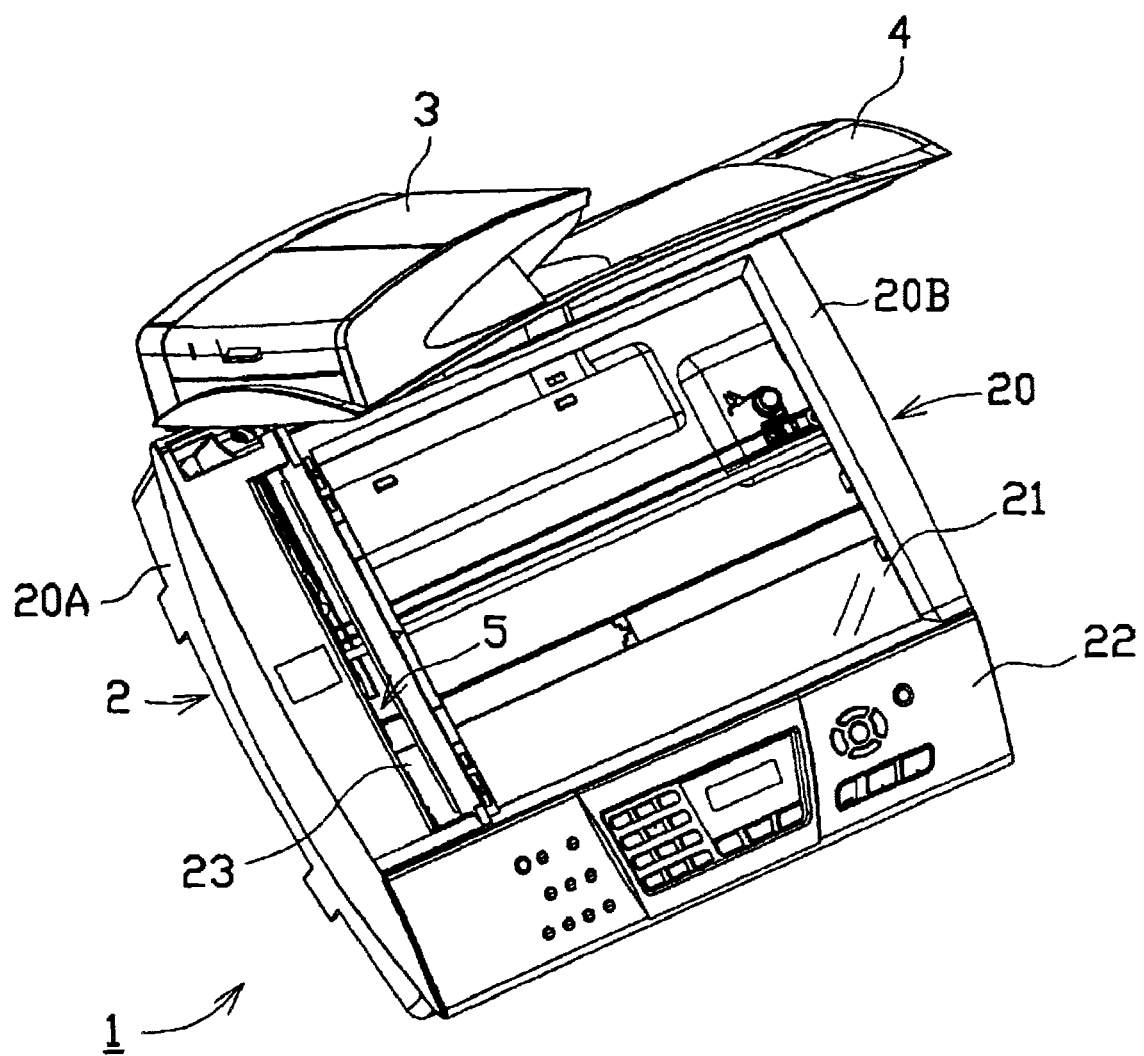
FIG. 1 is an external perspective view of an image reading apparatus according to a first embodiment of the invention.

First, an image reading apparatus according to a first embodiment of the invention will be described by referring to FIGS. 1-10. In FIG. 1, reference numeral 1 generally denotes an image reading apparatus according to the first embodiment. For instance, the image reading apparatus 1 may be used as a scanner of an MFD (Multi Function Device) that integrally includes a plurality of functions such aspringer function and scanner function, or may be used as an image reading apparatus of a copy machine. That is, the image reading apparatus 1 of the invention may or may not be integrated with another function. Namely, the image reading apparatus 1 may be implemented as a FBS (flatbed scanning machine) having only scanner function. In each of the embodiments described below, a carriage driving apparatus of the present invention is applied to an image reading apparatus. However, applications of the carriage driving apparatus of the invention are not limited to image reading apparatuses, and the carriage driving apparatus is widely applicable as an apparatus for reciprocating a carriage in an image reading apparatus in various machines such as scanning machine and copy machine, or a carriage in an image recording apparatus in various machines such aspringer and facsimile machine. For instance, the carriage driving apparatus of the invention may be used in an image recording apparatus such as serial printer, where an image recording device (e.g., a recording head) is mounted on a carriage so that an image is recorded on a recording medium by ejecting droplets of ink from the image recording device.

As shown in FIG. 1, the image reading apparatus 1 includes a reading table 2 functioning as a flatbed scanner, and a document holding cover 4 including an ADF (Auto Document Feeder) 3 and being openable/closable relative to the reading table 2. The reading table 2 includes a housing 20 in the shape of a substantially rectangular parallelepiped, a platen glass 21 disposed on top of the housing 20, and an image reading unit 5 disposed inside the housing 20. An image on a document is read or scanned such that a user places the document on the platen glass 21 and closes the document holding cover 4 to hold the document in position, and then the image reading unit 5 is reciprocated along a straight line to scan the image.

On the front side of the reading table 2, an operator panel 22 is disposed. The operator panel 22 includes various kinds of manual operation buttons and a liquid crystal display, and the image reading apparatus 1 is operated in response to an instruction inputted through the operator panel 22. Where the present image reading apparatus 1 is implemented as a portion of a MFD, the image reading apparatus 1 is connected to a computer to be operable in response to an instruction transferred from the computer by means of a printer driver or the like, as well as in response to an instruction from the operator panel 22.

The document holding cover 4 includes the ADF 3 that sequentially picks up document sheets set on a document tray one by one, and feeds each document sheet to a document catch tray. During the document sheet is fed by the ADF 3, the document sheet passes by a platen 23, under which is disposed the image reading unit 5 to read the image on the document sheet. As long as the essential functions described above are ensured, the ADF 3 may be constructed anywise.

Figure 2:
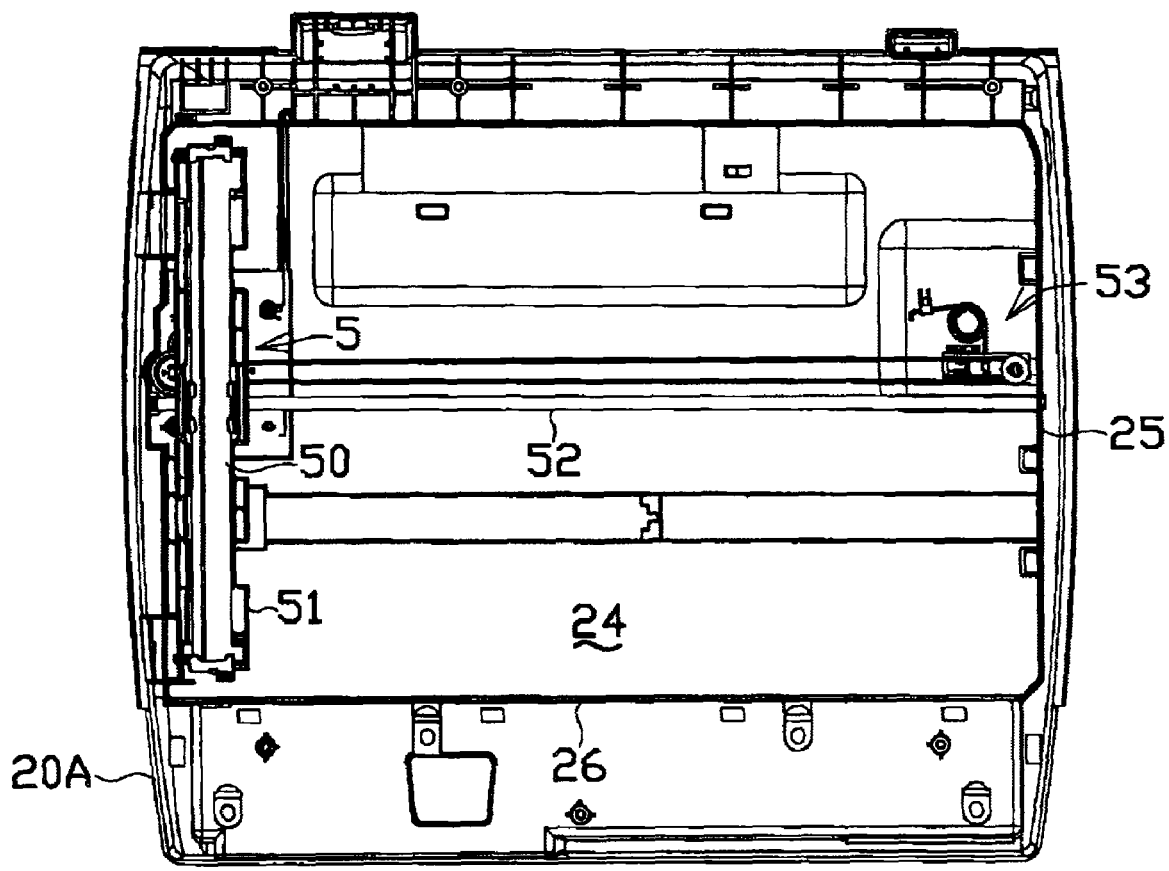
FIG. 2 is a plan view showing an inside of a reading table of the image reading apparatus.

The housing 20 of the reading table 2 includes a lower frame 20A and an upper frame 20B (hereinafter referred to as a cover 20B) both of which are made of synthetic resin. The lower frame 20A is a container-like member open on the upper side, in which the image reading unit 5 is disposed as shown in FIG. 2. The cover 20B has, at a central portion thereof, an opening for exposing the platen glass 21 to the exterior. The lower frame 20A includes a base 24, a side wall 25, and a partition plate 26 all of which are integrally formed. The base 24 is a bottom plate of the lower frame 20A, and the side wall 25 stands upright from an edge of the base 24. The partition plate 26 divides an internal space of the lower frame 20A into a first portion where the image reading unit 5 is disposed and a second portion where members including a circuit board for the operator panel 22 are disposed. The lower frame 20A further includes: a supporting rib for supporting the platen glass 21; bosses for screwing various kinds of members; and throughholes for electrical wiring and for other purposes. These members or elements of the lower frame 20A are designed suitably depending on the structure of the reading table 2, and detailed description thereof is dispensed with.

As shown in FIG. 2, the image reading unit 5 includes: a CIS unit 50 as an image reading device; a carriage 51; a guide shaft 52; and a carriage driving apparatus 53. The CIS unit 50 is a so-called close-contact type image sensor, which emits light toward the document placed on the platen glass 21, receives the light as reflected by the document, and converts the received light into electrical signals. The CIS unit 50 is mounted on the carriage 51 and reciprocated under the platen glass 21. The carriage 51 is coupled with the guide shaft 52 extending across the lower frame 20A in a lateral direction thereof, and driven by the carriage driving apparatus 53 to slide on and along the guide shaft 52. The CIS unit 50 is mounted on the carriage 51 such that when the carriage 51 is reciprocated along the guide shaft 52, the CIS unit 50 is held in close contact with the platen glass 21. That is, the CIS unit 50 is reciprocated along the platen glass 21.

Figure 3:
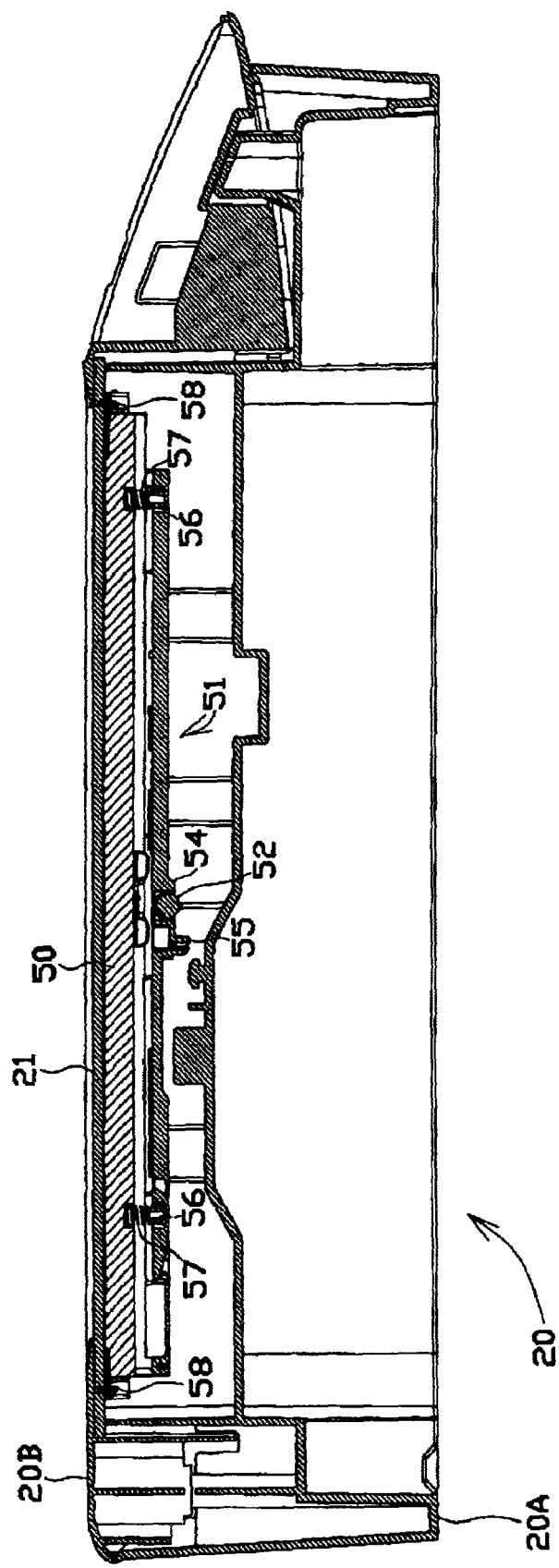
FIG. 3 is a vertical cross-sectional view showing a principal portion of the reading table.

As shown in FIG. 3, the CIS unit 50 is mounted on an upper side of the carriage 51 that has on an under surface thereof a shaft holder 54. The shaft holder 54 fits on the guide shaft 52 to hold the guide shaft 52 from the upper side. The engagement between the shaft holder 54 and the guide shaft 52 makes the carriage 51 slidable on and along the guide shaft 52, of movable in an axial direction of the guide shaft 52. At a side of the shaft holder 54, a belt holder 55 protrudes downward. The belt holder 55 holds a timing belt 61 of the carriage driving apparatus 53, in order to couple the carriage 51 with the timing belt 61. In this way, a drive force is transmitted from the carriage driving apparatus 53 to the carriage 51, so that the carriage 51 is moved or reciprocated along the guide shaft 52.

In the carriage 51 on which the CIS unit 50 is mounted, a spring bearing portion 56 is formed on each of front-side and rear-side end portions of the carriage 51. Each of the spring bearing portions 56 positions a coil spring 57 between the CIS unit 50 and the carriage 51. The coil spring 57 serves to bias the CIS unit 50 as mounted on the carriage 51 onto an under surface of the platen glass 21. At each of two opposite ends of the CIS unit 50 in the front-rear direction, a roller 58 is disposed in order to enable the CIS unit 50 to slide in close contact with the under surface of the platen glass 21, as the carriage 51 laterally moves.

Figure 4:
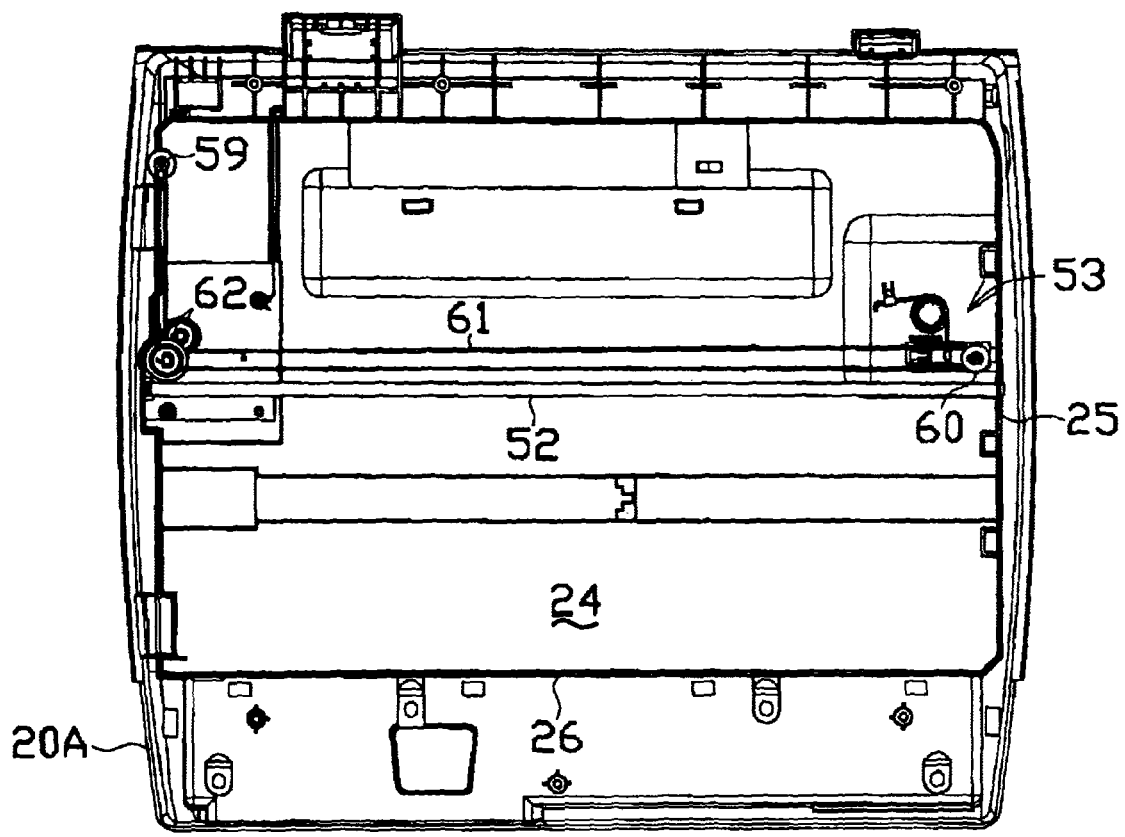
FIG. 4 is a schematic plan view of a carriage driving apparatus in the image reading apparatus.

As shown in FIG. 4, the carriage driving apparatus 53 is constructed such that the timing belt 61, which is an endless belt with teeth on an internal side thereof, is wound around a drive pulley 59 and a driven pulley 60, and a drive force of a motor (not shown) is outputted to a shaft of the drive pulley 59, so that the timing belt 61 is circulated by rotation of the drive pulley 59. More specifically, as shown in FIG. 4, the drive pulley 59 is located at a rear left marginal portion of the internal space of the lower frame 20A, and the timing belt 61 wound around the drive pulley 59 to extend frontward in the lower frame 20A is engaged with a pair of intermediate pulleys 62 disposed on the rear side of the guide shaft 52, and thus bent substantially at right angles at the intermediate pulleys 62. The timing belt 61 bent at the intermediate pulleys 62 then extends along the guide shaft 52 toward a right-hand marginal portion of the internal space of the lower frame 20A where the driven pulley 60 is disposed. Thus, the timing belt 61 is wound and entrained in an L-like shape. The belt holder 55 of the carriage 51 holds a portion of the timing belt 61 between the intermediate pulleys 62 and the driven pulley 60, that is, a portion extending along the guide shaft 52, in order to couple the carriage 51 with the timing belt 61. The timing belt 61 is not necessarily an endless belt, and a belt with ends may be used in place of an endless belt. When a belt with ends is used, the ends are fixed to the carriage 51.

There will be described a structure of supporting the driven pulley 60.

Figure 5:
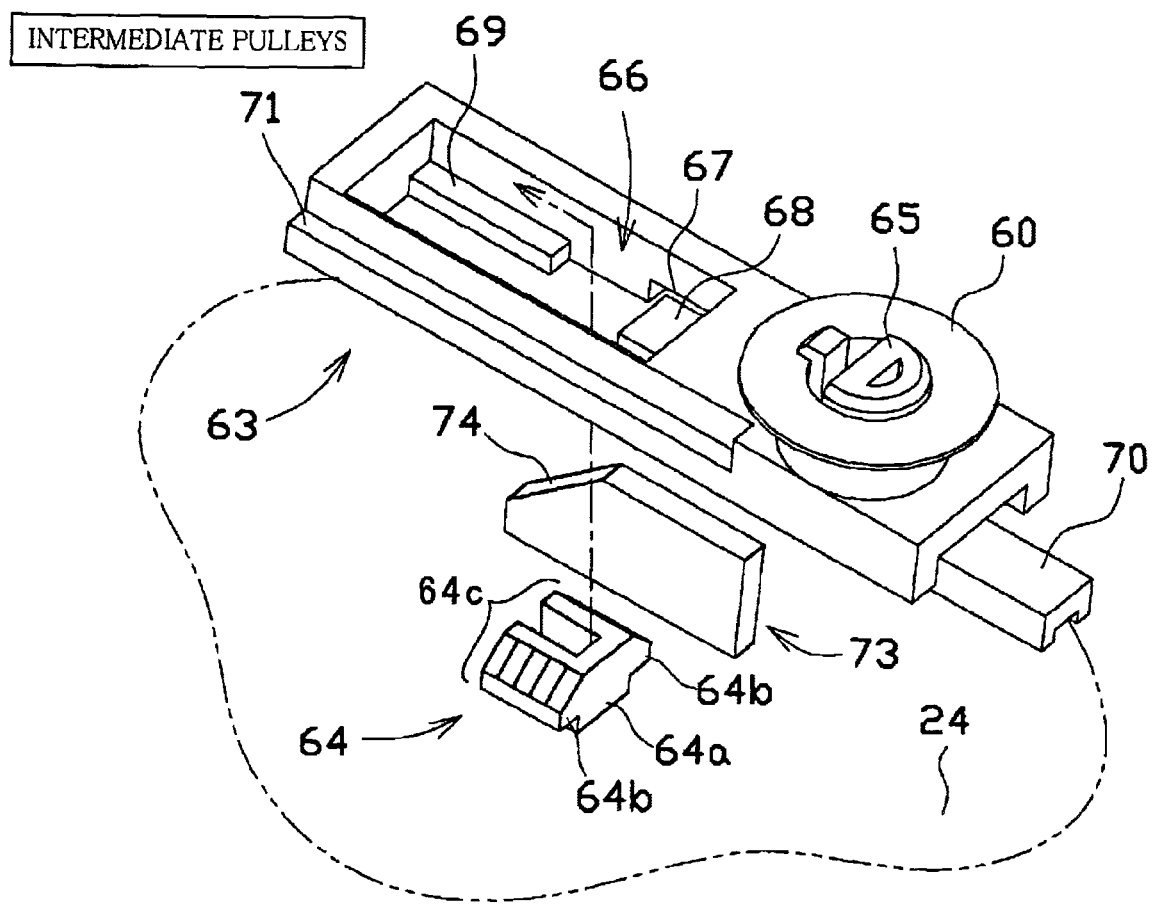
FIG. 5 is a fragmentary perspective view showing in enlargement a pulley holder, a guide member, and a restrictor rib of the carriage driving apparatus.

As shown in FIG. 5, the driven pulley 60 is supported by a pulley holder 63 such that the driven pulley 60 is rotatable around an axis or a shaft 65. The pulley holder 63 is engaged with a guide member 64 (corresponding to an external guide) protruding from the base 24 of the lower frame 20A, such that the pulley holder 63 is guidedly slidable in a guiding direction which is parallel to a direction along which the timing belt 61 is entrained or the guide shaft 52 extends. The pulley holder 63 is a substantially plate-like member, and the shaft 65 that rotatably supports the driven pulley 60 protrudes upward from an upper surface of the pulley holder 63 at a position remote from the intermediate pulleys 62 when the pulley holder 63 is set on the base 24 of the lower frame 20A. The driven pulley 60 is fitted on the shaft 65, and thus rotatably supported by the pulley holder 63.

A rectangular hole 66 is formed in a substantially half portion of the pulley holder 63 located on the side near the intermediate pulleys 62 when the pulley holder 63 is set on the base 24. More specifically, the rectangular hole 66 is formed at a central flat portion of the pulley holder 63 to be elongate along the extending direction of the timing belt 61. The pulley holder 63 is engaged with the guide member 64 that protrudes upward from the base 24, such that the guide member 64 is loosely fitted in the rectangular hole 66, so that the pulley holder 63 is slidable in a direction parallel to the extending direction of the timing belt 61. Hence, the rectangular hole 66 has such dimensions that the guide member 64 can be inserted and loosely fitted in the rectangular hole 66.

A cutout 67 is formed in a lower end portion of an internal rear-side surface of the pulley holder 63 that partially defines the rectangular hole 66, and at a lateral position that corresponds to a front one 77 (corresponding to an operating arm and a first arm) of two arms of a torsion coil spring 75 described later (shown in FIG. 7 and corresponding to a biaser or an elastic member) when the pulley holder 63 is set on the base 24, so that the first arm 77 of the torsion coil spring 75 is inserted therethrough. A first engaging portion 68 protrudes into the rectangular hole 66, from an internal surface of the pulley holder 63 partially defining the rectangular hole 66 and on the side remote from the intermediate pulleys 62 when the pulley holder 63 is set on the lower frame 20A. The first engaging portion 68 engages with a portion (corresponding to a first portion) of the first arm 77 of the torsion coil spring 75 inserted through the cutout 67 into the rectangular hole 66, thereby transmitting a biasing force of the torsion coil spring 75 to the pulley holder 63.

In the rectangular hole 66 and on the lateral side near the intermediate pulleys 62 when the pulley holder 63 is set on the lower frame 20A, a pair of ribs 69 protrude toward each other from lower portions of two opposed side wall surfaces of the rectangular hole 66, or internal surfaces of the pulley holder 63 that partially define the rectangular hole 66. Each rib 69 extends in a longitudinal direction of the rectangular hole 66. Thus, the pair of ribs 69 reduces a width of the rectangular hole 66 at the place where the ribs 69 are disposed. A clearance having such a reduced width between opposed end surfaces of the ribs 69 constitutes a guiding slot 66b (described later). A length of the ribs 69 is determined corresponding to a distance by which the pulley holder 63 is to be made slidable. Between the ribs 69 and the first engaging portion 68, there is formed a wide-open portion 66a having dimensions allowing passing of a head 64c (shown in FIG. 5 and described later) of the guide member 64 through the wide-open portion 66a. It is noted that a combination of the guiding slot 66b and the wide-open portion 66a constitutes an internal guide.

A straight protrusion 70 extends, in a direction in which the pulley holder 63 slides, from a lateral end surface of the pulley holder 63 which is remote from the intermediate pulleys 62 when the pulley holder 63 is set on the base 24. The straight protrusion 70 is fitted in a guiding through-hole 81 (described later) formed through the side wall 25 of the lower frame 20A, in order to guide the sliding movement of the pulley holder 63. An edge of the pulley holder 63 on the upper side thereof to be opposed to the belt holder 55 of the carriage 51 when the pulley holder 63 is set on the base 24, is partially cut away to form a shoulder 71 extending along a direction of reciprocation of the carriage 51, thereby preventing contact between the pulley holder 63 and the belt holder 55 of the carriage 51.

The guide member 64 is formed of synthetic resin integrally with the base 24 of the lower frame 20A such that the guide member 64 protrudes upward from the base 24. More specifically, as shown in FIG. 5, the guide member 64 includes a leg 64a and a head 64c. The leg 64a protrudes upward from an upper surface of the base 24. The head 64c includes a pair of engaging portions 64b, 64b. Each of the engaging portions 64b protrudes from one of opposite sides of a free end of the leg 64a, in a direction perpendicular to the direction of the sliding movement of the pulley holder 63, such that a clearance is formed between the upper surface of the base 24 and an under surface of the engaging portion 64b. A dimension from a protruding end of one of the engaging portions 64b to a protruding end of the other engaging portion 64b, namely, a width of the head 64c is smaller than a width of the wide-open portion 66a of the rectangular hole 66 formed in the pulley holder 63. A width of the leg 64a is slightly smaller than the clearance between the two ribs 69 disposed at the widthwise ends of the rectangular hole 66, which clearance corresponds to a width of the guiding slot 66b. The clearance between the base 24 and the under surface of each of the engaging portions 64b of the head 64c of the guide member 64 is slightly larger than a thickness or height of each of the ribs 69. A length of the guide member 64, or a dimension of the guide member 64 in the direction of the sliding movement of the pulley holder 63, is smaller than a length of the wide-open portion 66a or a dimension thereof in the same direction. The guide member 64 is inserted into the rectangular hole 66 such that the head 64c is passed through the wide-open portion 66a. When the pulley holder 63 is thereafter slid rightward so that the ribs 69 are located under the engaging portion 64b of the head 64c of the guide member 64, that is, the ribs 69 are interposed between the engaging portions 64b and the base 24, the engaging portions 64b engage with the ribs 69. This engagement guides the pulley holder 63 when the pulley holder 63 is slid relatively to the guide member 64 or the base 24, and prevents the pulley holder 63 from getting off of the base 24 or disengaging therefrom.

On the same side as the torsion coil spring 75 (shown in FIG. 7) with respect to the guide member 64, a restrictor in the form of a restrictor rib 73 is disposed, namely, protrudes upward from the base 24. The restrictor rib 73 is formed of synthetic resin integrally with the lower frame 20A, similarly to the guide member 64. By integrally forming the restrictor rib 73 with the base 24, the efficiency of assembly of the carriage driving apparatus 53 is enhanced since a step of assembling the restrictor rib 73 to the base 24 is omitted and the assembling of the pulley holder 63 is made easy. However, the restrictor rib 73 may be prepared separately from the lower frame 20A and fixed to the base 24 at a predetermined position. The restrictor rib 73 restricts turning or swinging movement of the first arm 77 of the torsion coil spring 75, which arm 77 is inserted through the cutout 67 of the pulley holder 63 to engage with the first engaging portion 68 in order to transmit the biasing force of the torsion coil spring 75 to the pulley holder 63. The restrictor rib 73 will be fully described later, and is described only briefly here. An upper edge in a protruding end portion of the restrictor rib 73 on the side of the intermediate pulleys 62 is cut away or chamfered to form a slant surface 74 (shown in FIG. 10) that is inclined in a direction to decrease a height of the restrictor rib 73 toward the side of the intermediate pulleys 62. The slant surface 74 is formed in order not to cause an excessive impact on the carriage 51 in the case where the carriage 51 that is about to pass by the restrictor rib 73 is undesirably brought into contact with the restrictor rib 73. This feature will be described later. The configuration of the restrictor rib 73 has been described only by way of example, and the restrictor for limiting the displacement or the swinging movement of the first arm 77 of the torsion coil spring 75 may be otherwise configured as desired, as long as the restrictor can limit the swinging movement of the first arm 77. For instance, the restrictor rib 73 may be replaced with a simple protrusion from the base 24.

Figure 6:
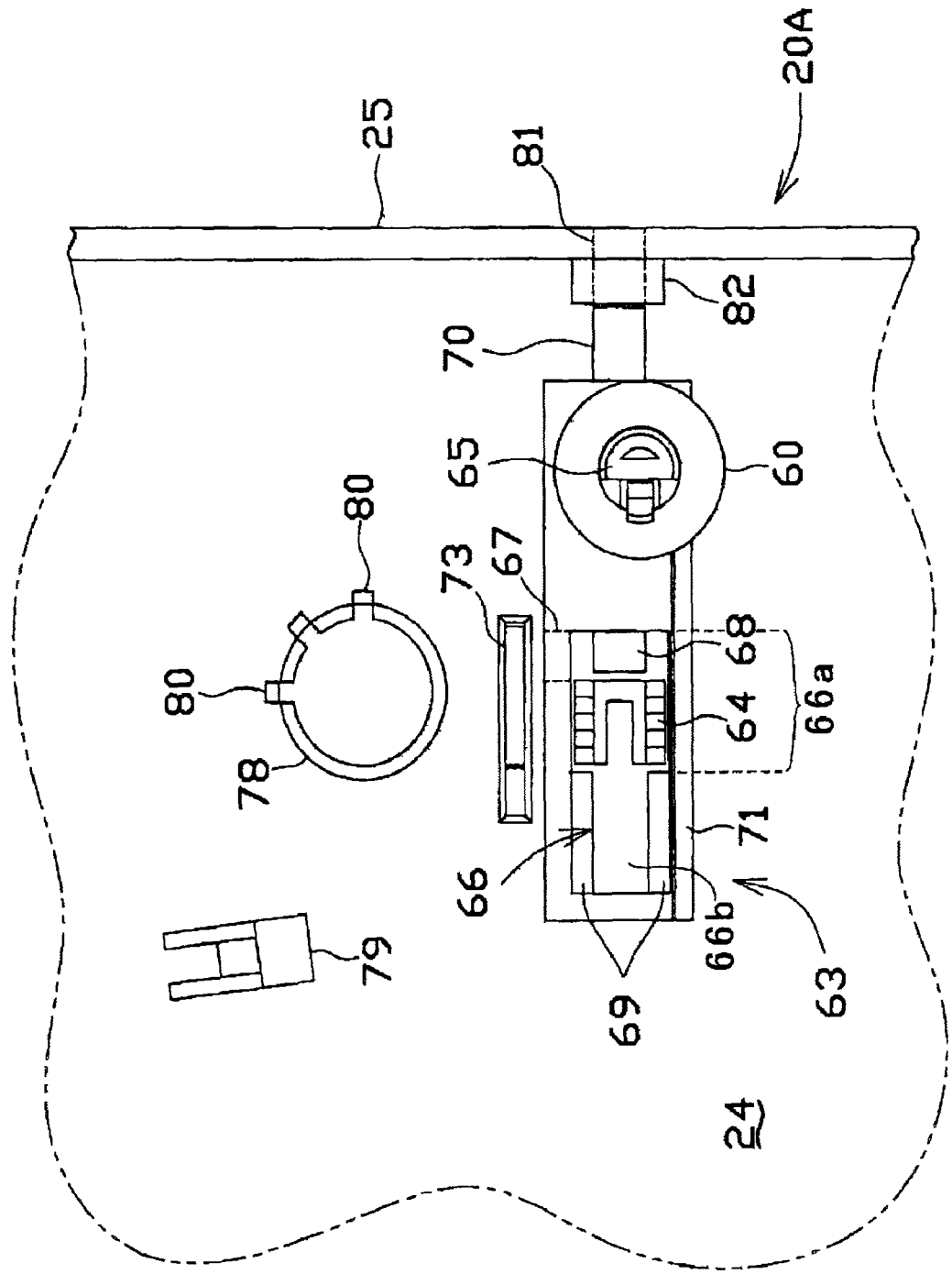
FIGS. 6-8 are fragmentary plan views showing in enlargement how a timing belt, the pulley holder, and a torsion coil spring of the carriage driving apparatus are assembled.
Figure 7:
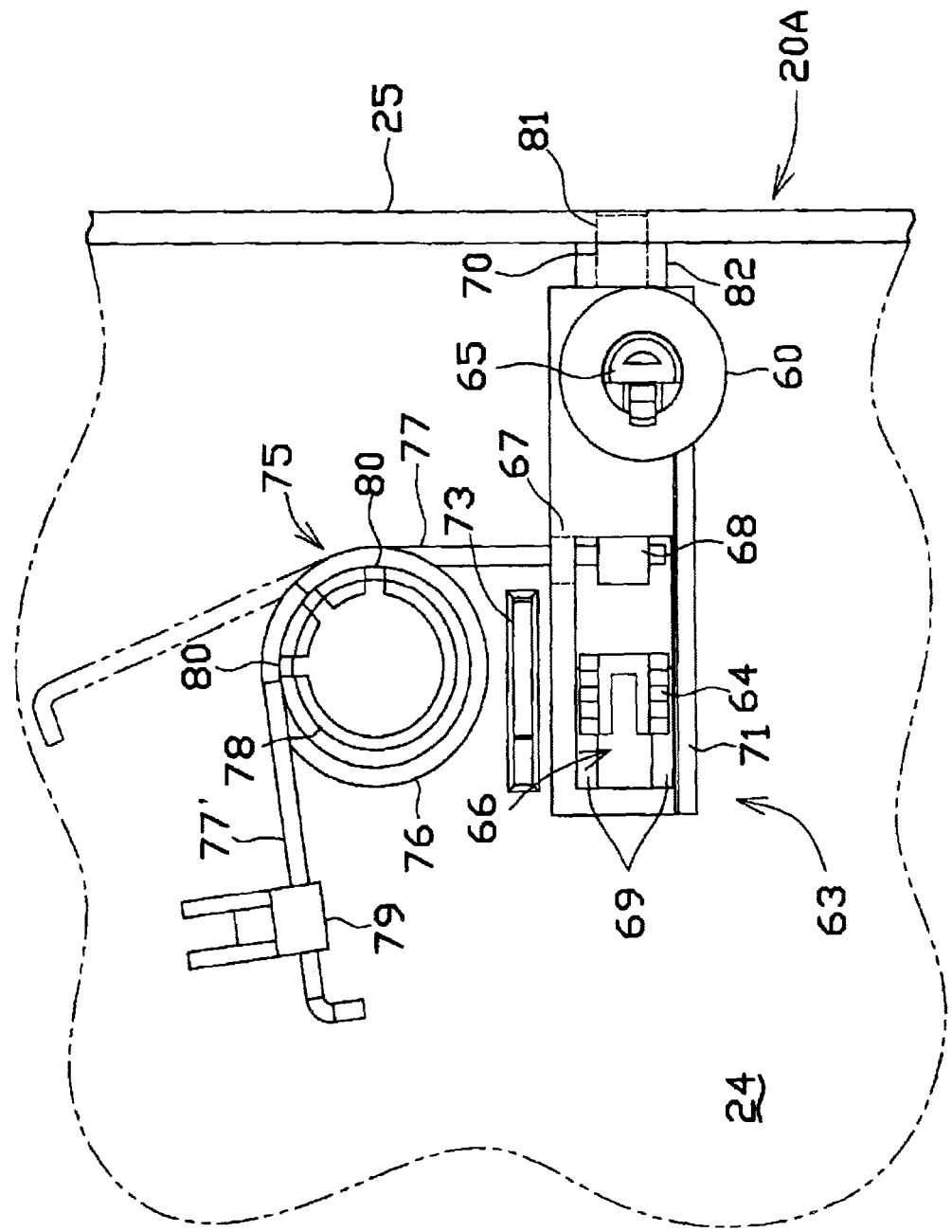

As shown in FIGS. 6 and 7, a spring supporter 78 and a second engaging portion 79 are formed of synthetic resin integrally with the lower frame 20A. The spring supporter 78 is disposed at a position on the same side as the restrictor rib 73 with respect to the guide member 64, but farther away from the guide member 64 than the restrictor rib 73. In addition to the first arm 77, the torsion coil spring 75 includes a coil portion 76 and a second arm 77' as a rear one of the two arms of the torsion coil spring 75. The coil portion 76 is loosely fitted on the spring supporter 78, and the second arm 77' engages with the second engaging portion 79. The spring supporter 78 is a circular cylindrical part protruding from the base 24, and has a disengagement preventer 80 in the form of a plurality (namely, three in this specific example) of ribs. Each of the ribs protrudes radially outward from an upper portion of an outer circumferential surface of the spring supporter 78. A circumferential position where the ribs of the disengagement preventer 80 protrude corresponds to a proximal portion of the torsion coil spring 75 from which the first and second arms 77', 77 extend. The spring supporter 78 has an external diameter smaller than an internal diameter of the coil portion 76 of the torsion coil spring 75 by such an amount that the spring supporter 78 can be inserted through the coil portion 76 when the torsion coil spring 75 is attached to the spring supporter 78 such that the torsion coil spring 75 is loosely fitted on the spring supporter 78 with a clearance left between the coil portion 76 and the spring supporter 78, even in the case where the spring supporter 78 is deformed due to heat or other reasons and the external diameter of the spring supporter 78 is increased, and even in the case where the coil portion 76 has a slight dimensional error. That is, when the first and second arms 77, 77' are not yet engaged with the first and second engaging portions 68, 79, the torsion coil spring 75 has a play relative to the spring supporter 78 and a contact point or position where the coil portion 76 and the spring supporter 78 contact each other is not unsettled, and thus the torsion coil spring 75 is movable in a horizontal direction by an amount corresponding to the play. However, when the first and second arms 77, 77' are engaged with the first and second engaging portions 68, 79, the vertical and horizontal contact positions between the coil portion 76 and the spring supporter 78 are settled or determined, as follows.

When the torsion coil spring 75 is attached to the spring supporter 78, the proximal portion of the torsion coil spring 75 is positioned below the disengagement preventer 80, thereby vertically positioning the torsion coil spring 75 or its proximal portion relative to the spring supporter 78, and also limiting an upward movement of the torsion coil spring 75 in order that the torsion coil spring 75 does not disengage from the spring supporter 78. With the first and second arms 77, 77' engaging with the first and second engaging portions 68, 79, respectively, the torsion coil spring 75 is held biased onto the outer circumferential surface of the spring supporter 78 at the circumferential position corresponding to the proximal portion, thereby horizontally positioning the torsion coil spring 75 relative to the spring supporter 78. Accordingly, the first arm 77 of the torsion coil spring 75 can be properly positioned irrespective of the internal diameter of the coil portion 76, thereby enhancing the accuracy of a position to which the swinging movement of the first arm 77 is limited. Further, the biasing force of the torsion coil spring 75 applied to the pulley holder 63 is stabilized.

Figure 8:
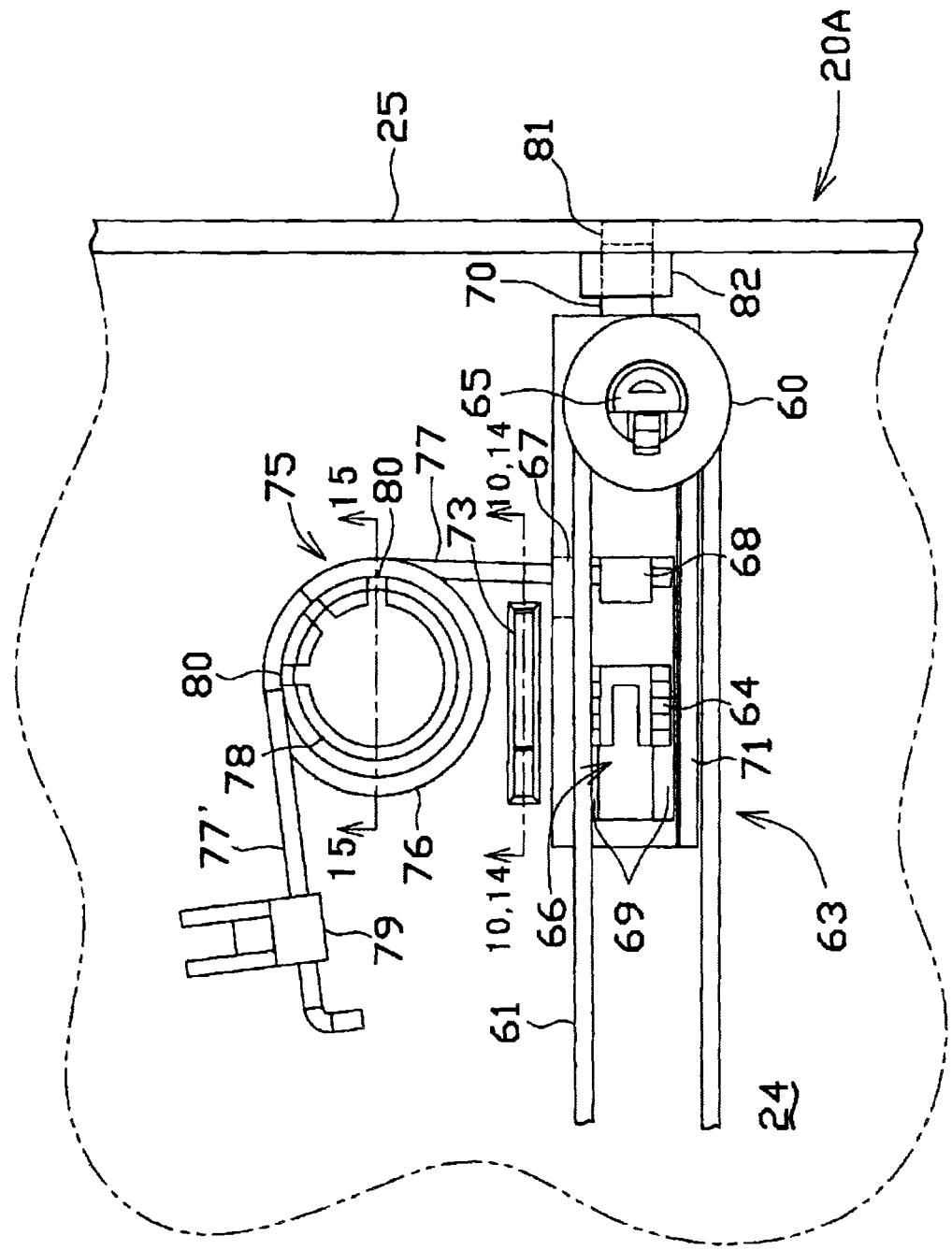

As shown in FIGS. 6 and 7 and briefly mentioned above, the guiding through-hole 81 is formed in the side wall 25 of the lower frame 20A in the vicinity of the pulley holder 63 as fitted on the guide member 64, and the pulley holder 63 has the straight protrusion 70 that fits in the guiding through-hole 81. More specifically, the guiding through-hole 81 is formed in a lower end portion of the side wall 25. On an internal surface of the side wall 25 is formed an extension 82 that defines inside thereof a hole continuous from the guiding through-hole 81. The hole in the extension 82 is provided since it is undesirable that the straight protrusion 70 fitted in the guiding through-hole 81 immediately comes off of the side wall 25 out of the guiding through-hole 81 when the pulley holder 63 is slid leftward as seen in FIGS. 6-8. Hence, the extension 82 is formed to have a length depending on a thickness of the side wall 25 and such that the presence of the extension 82 does not makes assembling of the pulley holder 63 to the lower frame 20A difficult.

There will be now described how the pulley holder 63 is attached to the lower frame 20A.

Initially, as shown in FIG. 6, the guide member 64 on the lower frame 20A is loosely fitted in the pulley holder 63. More specifically, the rectangular hole 66 in the pulley holder 63 is located over the guide member 64, and then the pulley holder 63 is lowered to have the guide member 64 loosely fit in the rectangular hole 66. The rectangular hole 66 has the first engaging portion 68 and the pair of ribs 69 that protrude from the widthwise ends of the rectangular hole 66 toward each other, but the clearance left between the first engaging portion 68 and the ribs 69 is sufficient for the loose fitting of the guide member 64 in the rectangular hole 66. The extension 82 has such a length that when the pulley holder 63 is assembled, namely, loosely fitted on the guide member 64, the extension 82 does not interfere with the straight protrusion 70 of the pulley holder 63. Hence, by lowering the pulley holder 63 from the upper side, the engage member 64 can be easily fitted in the rectangular hole 66 loosely.

Then, the torsion coil spring 75 is attached as shown in FIG. 7, so that the pulley holder 63 as loosely fitted on the guide member 64 as described above is biased toward the side wall 25, which is a direction to tense the timing belt 61 that is to be wound later. Thus, the guide member 64 engages with the ribs 69, and the straight protrusion 70 is inserted into the extension 82 and the guiding through-hole 81. In this way, the pulley holder 63 can be attached to the guide member 64 when the pulley holder 63 is at an end of a movable or slidable range thereof on a side to slacken the timing belt 61, and as the pulley holder 63 is moved from this position in a direction to tense the timing belt 61, the ribs 69 engage with the guide member 64 and the straight protrusion 70 fits in the extension 82 and the guiding through-hole 81, thereby making the guide protrusions 69 and the straight protrusion 70 guidedly slide in a direction toward the side of the driven pulley 60 around which the timing belt 61 is wound. As shown in FIG. 7, the position where an end surface of the pulley holder 63 (which is not a surface in the straight protrusion 70) is brought into abutting contact with the extension 82 corresponds to an end of the slidable range of the pulley holder 63 on a side to tense the timing belt 61. When the pulley holder 63 is at this end of the slidable range, the straight protrusion 70 does not protrude out into the exterior of the side wall 25. With lengths of the straight protrusion 70 and the extension 82 properly determined so as to accomplish the above-described operation, a space is not required outside the side wall 25 for allowing protrusion of the straight protrusion 70 outward of the side wall 25. Hence, the size of the image reading apparatus 1 is reduced.

After the pulley holder 63 is moved from the end of the slidable range on the side to slacken the timing belt 61 to the other end to tense the timing belt 61, the first arm 77 of the torsion coil spring 75 is inserted into the rectangular hole 66 through the cutout 67 of the pulley holder 63 and engaged with the first engaging portion 68. The coil portion 76 of the torsion coil spring 75 is fitted on the spring supporter 78. In this state, the second arm 77' of the torsion coil spring 75 is free, as indicated by chain line in FIG. 7. Then, the second arm 77' is turned or swung against the spring force of the torsion coil spring 75 to be engaged with the second engaging portion 79. This generates a spring force at the first arm 77 engaging with the first engaging portion 68 of the pulley holder 63, to turn or swing the first arm 77 around an axis that is the contact point between the coil portion 76 and the outer circumferential surface of the spring supporter 78, toward the side wall 25, and the spring force is thus transmitted to the pulley holder 63 from the first arm 77, thereby biasing the pulley holder 63 to the side to tense the timing belt 61.

Figure 11:
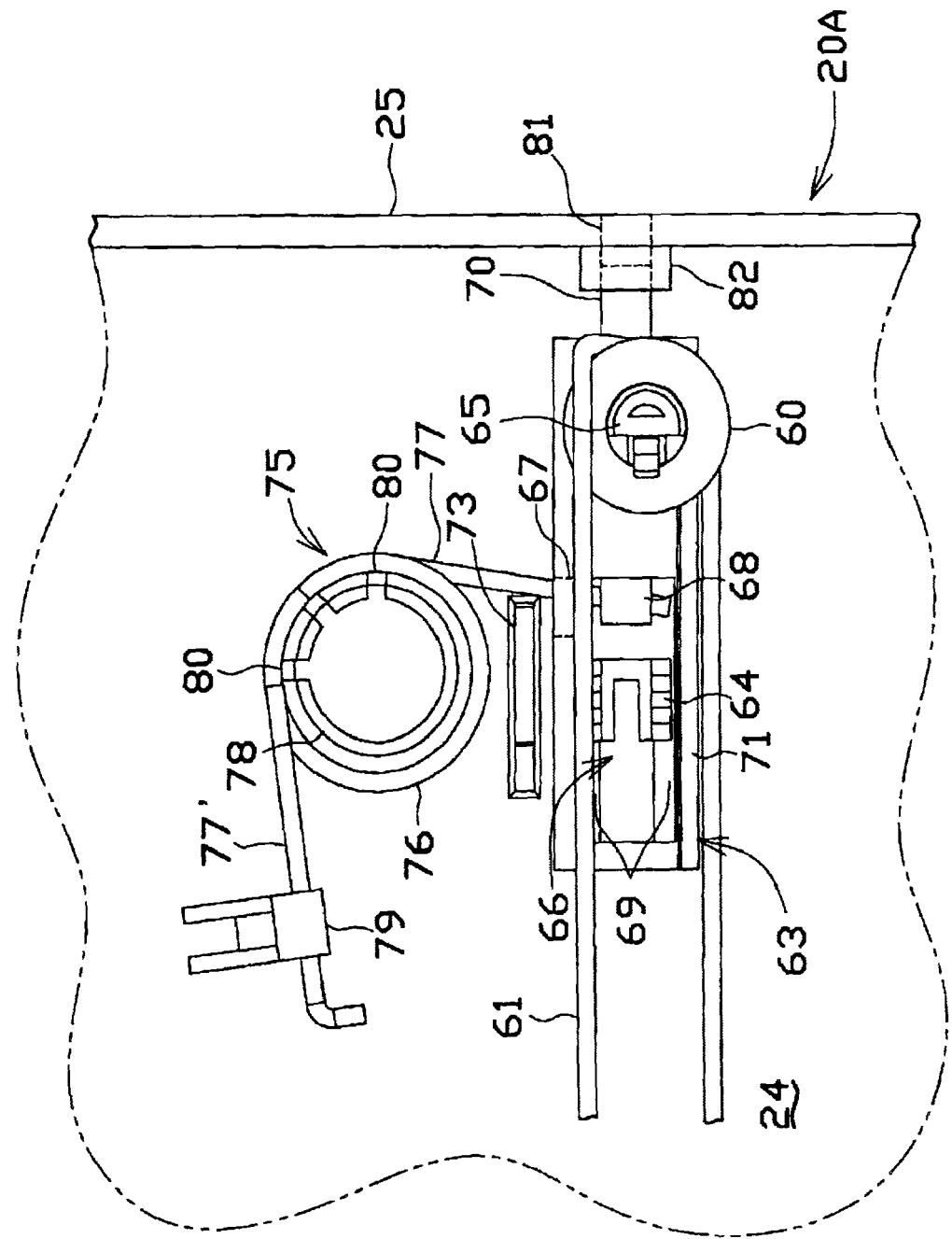
FIG. 11 is a fragmentary plan view illustrating a way of assembling the carriage driving apparatus.

Thereafter, the timing belt 61 is wound around the driven pulley 60, as shown in FIG. 8, so that the timing belt 61 is entrained in the L-like shape around the drive pulley 59 and the driven pulley 60 while engaged with the intermediate pulleys 62 interposed therebetween, as shown in FIG. 4. Wound around the drive and driven pulleys 59, 60, the timing belt 61 is tensioned and the tensile force in the timing belt 61 acts on the pulley holder 63 via the driven pulley 60, which is accordingly pulled in a direction to slacken the timing belt 61 (or pulled to the "slackening side") against the biasing force of the torsion coil spring 75. By this tensile force of the timing belt 61, the first arm 77 of the torsion coil spring 75 is displaced or swung in the direction to slacken the timing belt 61. Hence, the pulley holder 63 comes to rest at a position where the biasing force of the torsion coil spring 75 and the tensile force of the timing belt 61 balance. However, when the timing belt 61 is wound around the driven pulley after the attachment of the torsion coil spring 75, it is necessary to apply a relatively large tensile force to the timing belt 61 to forcibly wind the timing belt 61 around the driven pulley while the pulley holder 63 is held at the leftmost position currently possible (as seen in FIG. 11) in the slidable range thereof (i.e., a position corresponding to the limit position of the first arm 77 as determined by the restrictor rib 73 as described later). Even where the lower frame 20A or other members suffers from thermal deformation and a distance between the drive pulley 59 or the intermediate pulleys 62 and the driven pulley 60 changes, the pulley holder 63 slides in either of opposite directions along the extending direction of the timing belt 61 to keep constant the tensile force in the timing belt 61, with the biasing force varied within a relatively small range.

Figure 12:
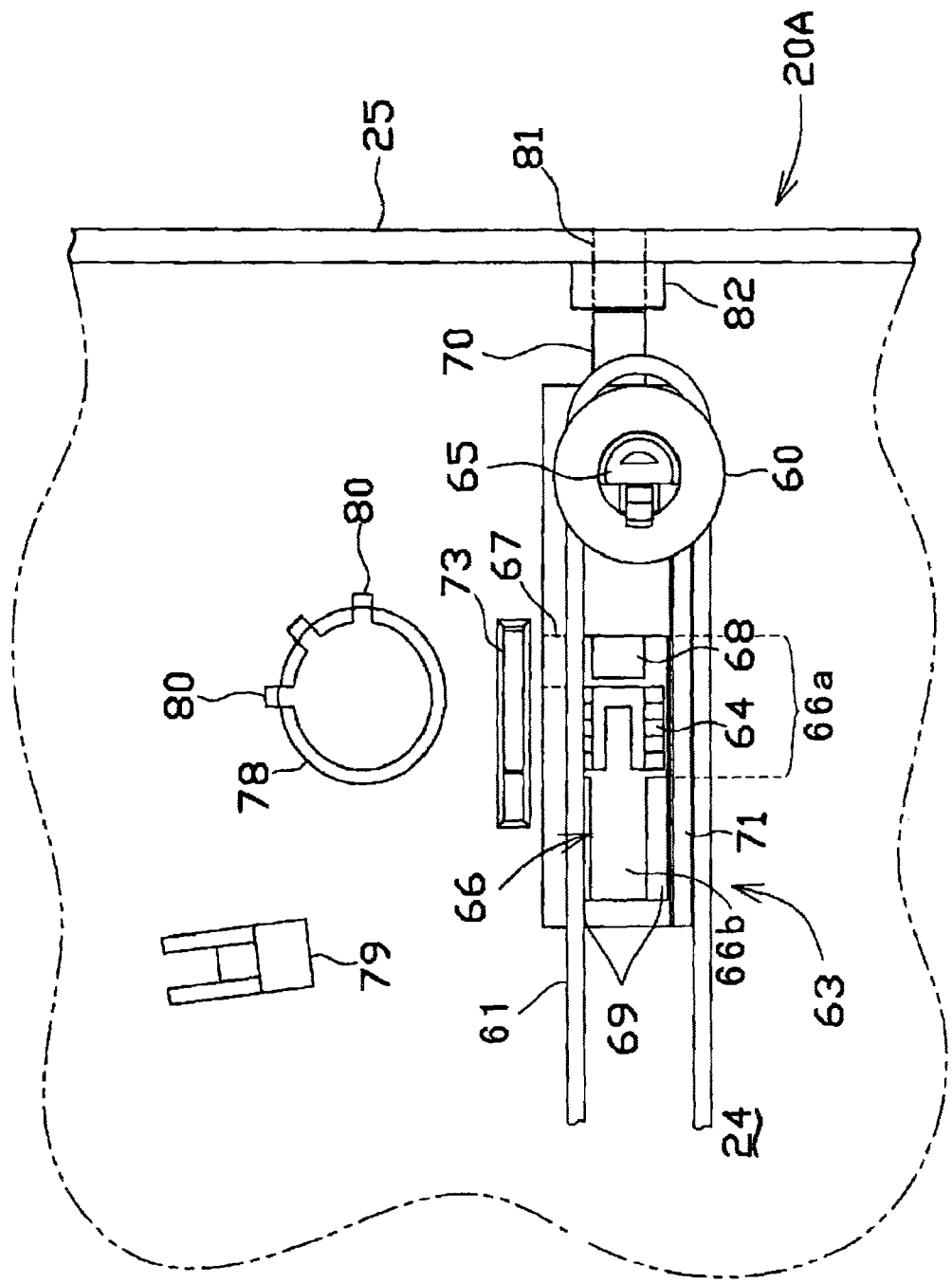
FIG. 12 is a fragmentary plan view illustrating another way of assembling the carriage driving apparatus.

Although in the above description the timing belt is wound around the driven pulley after attachment of the torsion coil spring 75 to the base 24, the order of the steps of assembling the carriage driving apparatus 53 may be changed. That is, the carriage driving apparatus may be assembled such that the timing belt 61 is wound around the driven pulley 60 before the torsion coil spring 75 is attached to the base 24. More specifically, the timing belt 61 is first wound around the driven pulley 60, before the torsion coil spring 75 is attached, and while the pulley holder 63 is located at the leftmost position in its slidable range, namely, the position where the guide member 64 is loosely fitted in the wide-open portion 66a, as shown in FIG. 12. Thereafter, the torsion coil spring 75 is attached as follows. Initially, the first arm 77 is inserted into the rectangular hole 66 through the cutout 67 and engaged with the first engaging portion 68. Then, the coil portion 76 is loosely fitted around the spring supporter 78 and the second arm 77' is engaged with the second engaging portion 79, as shown in FIG. 8. The biasing force of the attached torsion coil spring 75 acts on the pulley holder 63, which is accordingly biased in the tensioning direction, and the pulley holder 63 comes to rest at a position where the biasing force and the tensile force in the timing belt 61 balance. Once assembled in this way, the sliding movement of the pulley holder 63 in the slackening direction is limited by the restrictor rib 73 to a disengagement inhibit position corresponding to the limit position of the first arm 77 where the first arm 77 is brought into contact with the restrictor rib 73 and further swinging movement thereof in the same direction becomes impossible. Thus, disengagement of the timing belt 61 from the driven pulley 60 is prevented. According to this assembly method, the timing belt 61 can be easily wound around the driven pulley 60 with a relatively small force.

Figure 9:
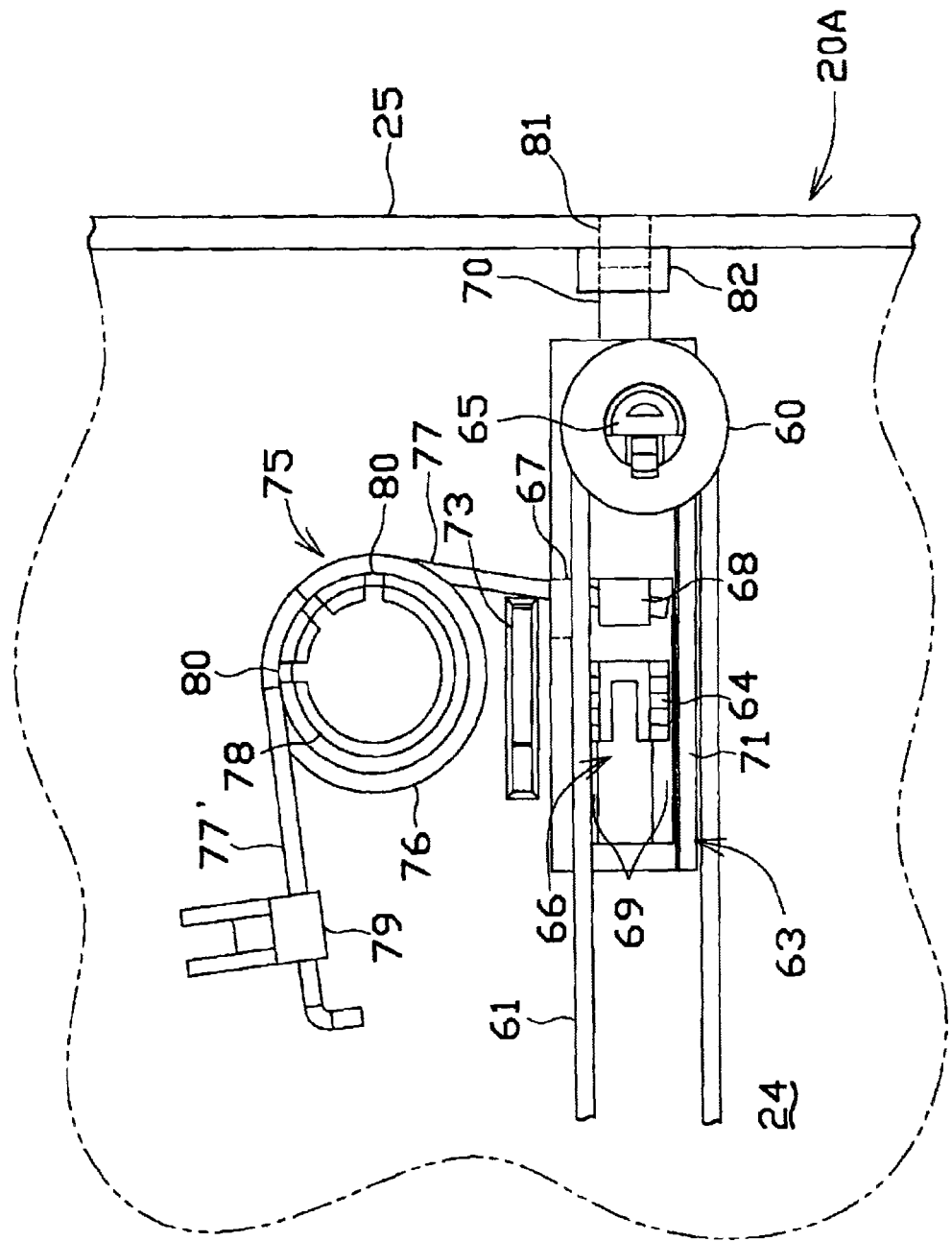
FIG. 9 is a fragmentary plan view illustrating a state where a swinging movement of a first arm of the torsion coil spring is restricted.

When an impact is imposed on the image reading apparatus 1 during transportation thereof and the carriage 51 on which the CIS unit 50 is mounted abruptly moves, a large tensile force occurs in the timing belt 61. Where the tensile force in the timing belt 61 changes for such a reason or otherwise, a force to swing the first arm 77 of the torsion coil spring 75 is exerted on the first arm 77 in accordance with the tensile force, thereby sliding the pulley holder 63. However, as shown in FIG. 9, by being brought into contact with the restrictor rib 73, the first arm 77 of the torsion coil spring 75 is prevented from swinging in the direction to slacken the timing belt 61 farther than a predetermined limit position corresponding to the restrictor rib 73. In other words, the first arm 77 is allowed to swing in the direction to slacken the timing belt 61 within a range not to contact the restrictor rib 73.

The predetermined limit position, namely, the position where the first arm 77 of the torsion coil spring 75 contacts the restrictor rib 73, is determined to be located on the right side (as seen in FIG. 6) of the first engaging portion 68 when the pulley holder 63 is fitted on the guide member 64 at the left-hand end of the slidable range thereof, while taking account of that the slidable range of the pulley holder 63 should be appropriate for keeping the tensile force of the timing belt 61 substantially constant in correspondence with an accumulated error of the involved members including the pulley holder 63 and the guide member 63, and the deformation of the lower frame 20A or others. In other words, the restrictor rib 73 serves to prevent the pulley holder 63 from coming off of the guide member 64 due to the pulley holder 63 reaching the end of the slidable range on the side to slacken the timing belt 61, and therefore the restrictor rib 73 allows swing of the first arm 77 only within an engaging range where the guide member 64 engages with the ribs 69 as well as the straight protrusion 70 engages with the guiding through-hole 81 or the extension 82. Thus, the predetermined limit position is set within the engaging range to allow engagement between the guide member 64 and the pulley holder 63, and also within the slidable range of the pulley holder 63 relative to the base 24.

The contact of the first arm 77 of the torsion coil spring 75 with the restrictor rib 73 prevents the pulley holder 63 in engagement with the first arm 77 from sliding to the end of the slidable range on the side to slacken the timing belt 61. Hence, even when an impact is imposed on the image reading apparatus 1 and a large tensile force occurs in the timing belt 61, the pulley holder 63 does not reach the end of the slidable range on the side to slacken the timing belt 61, thereby preventing the pulley holder 63 from disengaging from the guide member 64.

Figure 10:
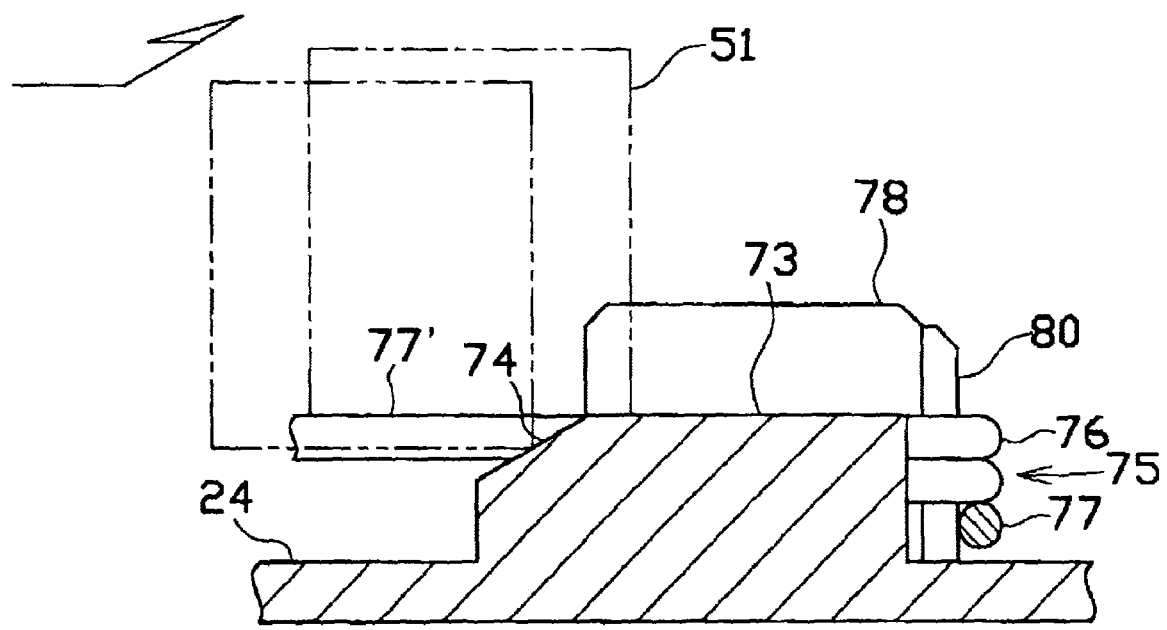
FIG. 10 is a cross-sectional view taken along line 10, 12-10, 12 in FIG. 8, and shows a state where a carriage is brought into contact with a slant surface of the restrictor rib.

As shown in FIG. 10, the restrictor rib 73 has the slant surface 74 at its side near the intermediate pulleys 62. Thus, even where the carriage 51 reciprocated over the restrictor rib 73 contacts the restrictor rib 73 due to a change in a height of the restrictor rib 73 caused by thermal deformation of the lower frame 20A, the impact imposed on the carriage 51 upon the contact is not excessively high. More specifically, as shown in FIG. 3, the shaft holder 54 formed on the under side of the carriage 51 is fitted on the guide shaft 52 to hold the guide shaft 52 from the upper side, and the timing belt 61 coupled with the carriage 51 by means of the belt holder 55 slightly deflects due to sliding movement of the pulley holder 63 and for other reasons, the carriage 51 is upward displaceable off the guide shaft 52. While the CIS unit 50 on the carriage 51 is held in close contact with the platen glass 21, the CIS unit 50 and the carriage 51 can be separated away from each other up to a distance corresponding to a maximum amount of expansion of the coil spring 57 interposed therebetween, although actually the contact between the shaft holder 54 and the guide shaft 52 prevents further separation. In other words, the carriage 51 is displaceable upward or toward the CIS unit 50 while the CIS unit 50 is held in close contact with the platen glass 21.

Hence, the contact of the reciprocated carriage 51 with the restrictor rib 73 is made as follows. A lower edge of the carriage 51 is brought into contact with the slant surface 74 of the restrictor rib 73, and as the carriage 51 is further moved laterally, the carriage 51 slides on the slant surface 74 to be gradually pushed upward to approach the CIS unit 50 against the spring force of the coil springs 57, as indicated by chain line in FIG. 10. Thus, a side surface of the carriage 51 and a side surface of the restrictor rib 73 are not brought into abutting contact with each other that would otherwise apply such an impact as to stop the reciprocation of the carriage 51. Hence, even in the case of change in the height of the restrictor rib 73 due to thermal deformation or for other reasons, an impact that would cause a problem with the carriage 51 and the carriage driving apparatus 53 does not occur, thereby preventing a serious failure in the carriage driving apparatus 53 and others. In the present embodiment, the slant surface 74 is formed in the restrictor rib 73 only on the side near the intermediate pulleys 62. However, an upper edge of the restrictor rib 73 on the side near the side wall 25 may also be chamfered to provide a slant surface like the slant surface 74.

Figure 13:
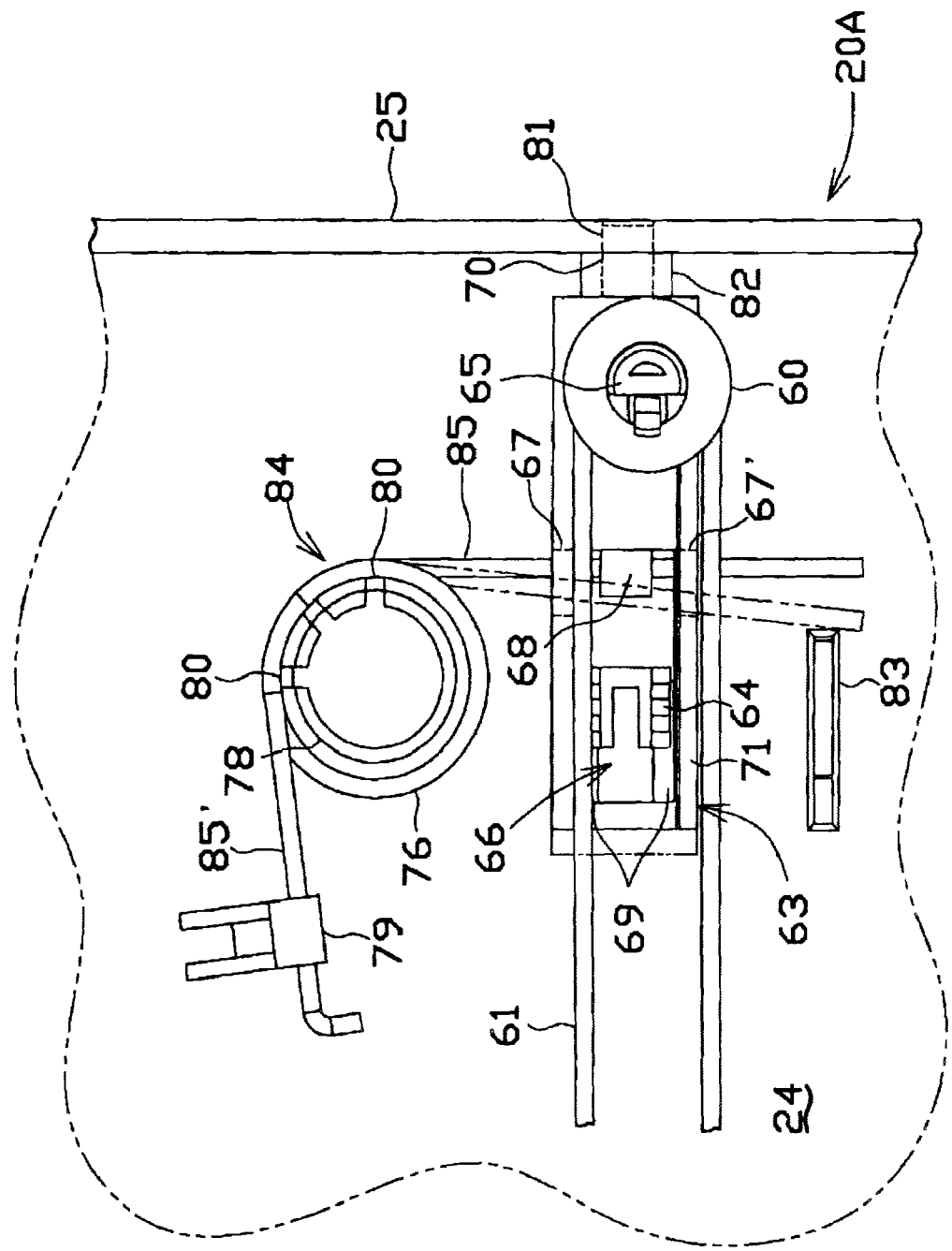
FIG. 13 is a fragmentary plan view showing in enlargement a carriage driving apparatus including a restrictor rib, in an image reading apparatus according to a second embodiment of the invention.

Referring now to FIG. 13, there will be described an image reading apparatus according to a second embodiment of the invention. The second embodiment is different from the first embodiment only at a position where the restrictor rib is disposed, and there will be described only the different part and the elements or parts corresponding to those in the first embodiment will be denoted by the same reference numerals and description thereof is dispensed with.

In the second embodiment shown in FIG. 13, a restrictor rib 83 protrudes from a base 24 at a side of a guide member 64 opposite to a torsion coil spring 84. The restrictor rib 83 is the same as the restrictor rib 73 of the first embodiment in that the restrictor rib 83 is integrally formed with a lower frame 20A of synthetic resin, and limits swinging movement of a front one 85 of two arms (i.e., a first arm 85) of a torsion coil spring 84 that transmits its biasing force to a pulley holder 63.

The first arm 85 of the torsion coil spring 84 is inserted through a first cutout 67 in the pulley holder 63 into a rectangular hole 66 to be engaged with a first engaging portion 68, and extends further through a side wall of the pulley holder 63 remote from the torsion coil spring 84. That is, a second cutout 67' is formed in a lower end portion of a side wall of the pulley holder 63 opposite to the side wall through which the cutout 67 is formed. The other arm 85' of the torsion coil spring 84 (i.e., a second arm 85') engages with a second engaging portion 79. The torsion coil spring 84 biases the pulley holder 63 in a direction to tension a timing belt 61, or biases the pulley holder 63 to the "tensioning side". This direction may be referred to as "tensioning direction".

A tensile force in the timing belt 61 wound around the driven pulley 60 acts on the pulley holder 63 via the driven pulley 60, thereby pulling the pulley holder 63 in a direction to slacken the timing belt 61 against the biasing force of the torsion coil spring 84. By the tensile force of the timing belt 61, the first arm 85 of the torsion coil spring 84 is displaced or swung around a contact point between a coil portion 76 of the torsion coil spring 84 and a spring supporter 78, in the direction to slacken the timing belt 61. The pulley holder 63 comes to rest at a position where the tensile force of the timing belt 61 and the biasing force that the torsion coil spring 84 applies to the pulley holder 63 balance. Thus, the tensile force is kept constant in the timing belt 61, with the biasing force varied within a relatively small range.

When a large tensile force occurs in the timing belt 61, the pulley holder 63 strives to move or slide in accordance with the tensile force, with the first arm 85 of the torsion coil spring 84 swung. However, as shown in FIG. 13, the first arm 85 of the torsion coil spring 84 is brought into contact with the restrictor rib 83, thereby being inhibited from farther swinging in the direction to slacken the timing belt 61. Hence, the pulley holder 63 engaging with the first arm 85 can not slide to an end of a slidable range of the pulley holder 63 on a side to slacken the timing belt 61 where the pulley holder 63 can disengage from the guide member 64, thereby preventing the pulley holder 63 from disengaging from the guide member 64.

In this way, the second embodiment where the restrictor rib 83 is disposed at the side of the guide member 64 opposite to the torsion coil spring 84 can also obtain the same effects as the first embodiment. The first arm 85 of the torsion coil spring 84 is allowed to swing in the direction to slacken the timing belt 61, within a swingable range before the first arm 85 contacts the restrictor rib 83, and the pulley holder 63 moves or slides within a range corresponding to the swingable range. By disposing the restrictor rib 83 at the side of the pulley holder 63 opposite to the torsion coil spring 84, a displaceable range within which an end of the first arm 85 is moveable is made wider than the range within which the pulley holder 63 engaged with the first arm 85 is slidable. Thus, an error of a limit position, from which the pulley holder 63 is inhibited from further sliding in the direction to slacken the timing belt 61, and which corresponds to a disengagement inhibit position, is small relatively to an error of a limit position where the restrictor rib 83 inhibits a further swinging movement of the first arm 85. This is a preferable feature in designing the carriage driving apparatus 53.

Figure 14:
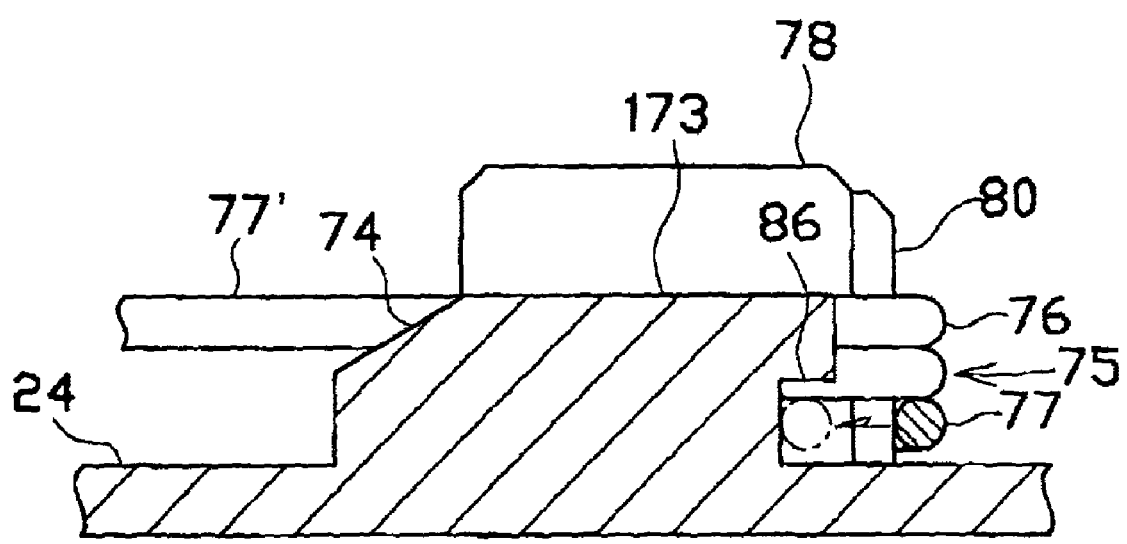
FIG. 14 is a cross-sectional view corresponding to FIG. 10 taken along line 10, 14-10, 14 in FIG. 8, and shows a restrictor rib having a cutout, in a carriage driving apparatus of an image reading apparatus according to a third embodiment of the invention.

There will be now described an image reading apparatus according to a third embodiment of the invention, by referring to FIG. 14. The third embodiment is basically identical with the first embodiment except a part, and there will be described only the different part and the elements or parts corresponding to those in the first embodiment will be denoted by the same reference numerals and description thereof is dispensed with.

As shown in FIG. 14, the image reading apparatus has a restrictor rib 173 that limits swinging movement of a first arm 77 of a torsion coil spring 75. The restrictor rib 173 has a cutout 86 formed in a contact surface thereof at which the first arm 77 contacts with the restrictor rib 173. More specifically, the cutout 86 is long parallel to a longitudinal direction of the first arm 77, so that a portion (corresponding to a second portion) of the first arm 77 as brought into contact with the restrictor rib 173 fits a bottom portion of the cutout 86. Hence, even when an excessive tensile force occurs in the timing belt 61, it is prevented that the first arm 77 slips on the contact surface of the restrictor rib 173 to disengage from the restrictor rib 173.

The arrangement of the third embodiment may be implemented in the second embodiment shown in FIG. 13, namely, the same cutout as the cutout 86 may be formed in a contact surface of the restrictor rib 83 at which the first arm 85 contacts the restrictor rib 83, in order to achieve the same operation and effect as the third embodiment.

Figure 15:
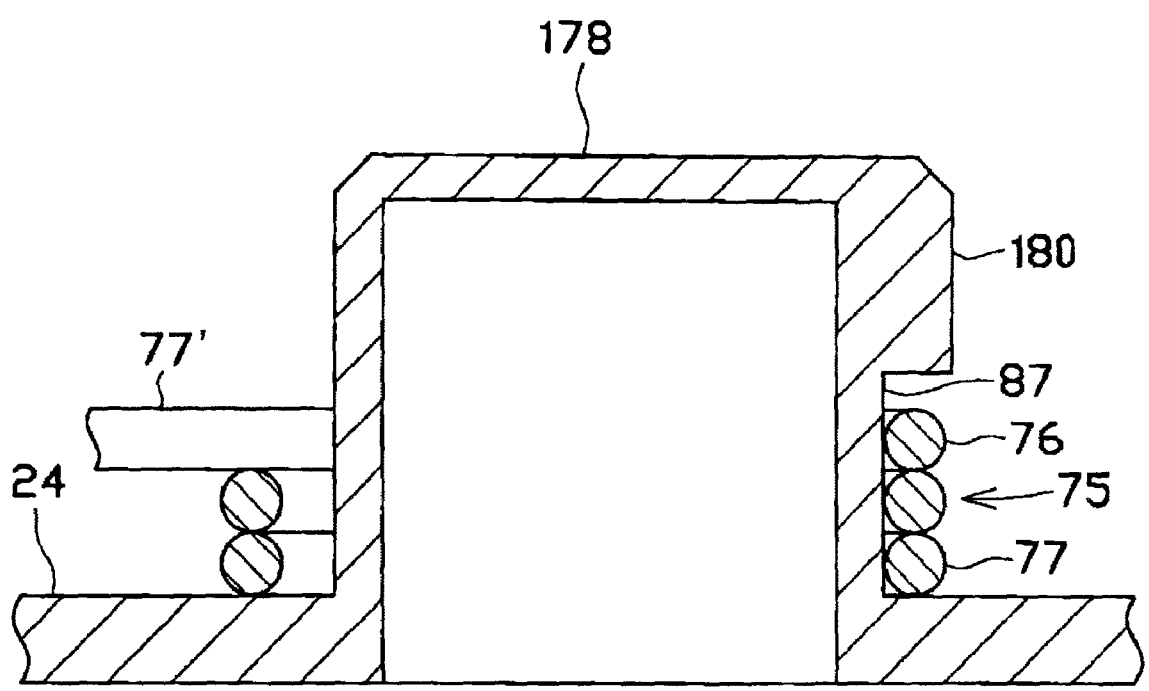
FIG. 15 is a cross-sectional view corresponding to a view taken along line 15-15 in FIG. 8, and shows a disengagement preventer in a carriage driving apparatus of an image reading apparatus according to a fourth embodiment of the invention.

There will be now described an image reading apparatus according to a fourth embodiment of the invention, by referring to FIG. 15. The fourth embodiment is basically identical with the first embodiment except a part, and there will be described only the different part and the elements or parts corresponding to those in the first embodiment will be denoted by the same reference numerals and description thereof is dispensed with.

A spring supporter 178 has on its outer circumferential surface a disengagement preventer 180 for positioning a proximal portion of a torsion coil spring 75. As shown in FIG. 15, the disengagement preventer 180 is formed such that an engaging groove 87 is formed on a contact surface of the spring supporter 178 which contact surface is a portion of an outer circumferential surface of the spring supporter 178 at which a coil portion 76 and the proximal portion of the torsion coil spring 75 contact the spring supporter 178. That is, the engaging groove 87 is a hollow that is dug in the outer circumferential surface of the spring supporter 178 radially inward of the coil portion 76 of the torsion coil spring 75. The coil portion 76 and the proximal portion fit in the engaging groove 87, thereby preventing disengagement of the torsion coil spring 75 from the contact surface of the spring supporter 178. Thus, a movable range of the coil portion 76 in a direction perpendicular to a surface of the base is determined.

In each of the above-described embodiments, the torsion coil spring 75, 84 is employed as a biasing member for applying a biasing force to the pulley holder 63. However, the structure to bias the pulley holder 63 is not limited to the structure using a torsion coil spring, but any other known structures may be employed as desired for biasing the pulley holder 63 in the direction to tension the timing belt 61. For instance, there may be employed an arrangement including a member having an arm that is engaged with the pulley holder 63 and swingable around a predetermined position on the base 24 in a direction to tension the timing belt 61, and another member, such as a coil spring and a plate spring, that biases the arm in the direction to tension the timing belt 61.

There will be described an image reading apparatus according to a fifth embodiment of the invention, by referring to FIGS. 14 and 15. The fifth embodiment is basically identical with the first embodiment except a part, and there will be described only the different part and the elements or parts corresponding to those in the first embodiment will be denoted by the same reference numerals and description thereof is dispensed with.

Figure 16:
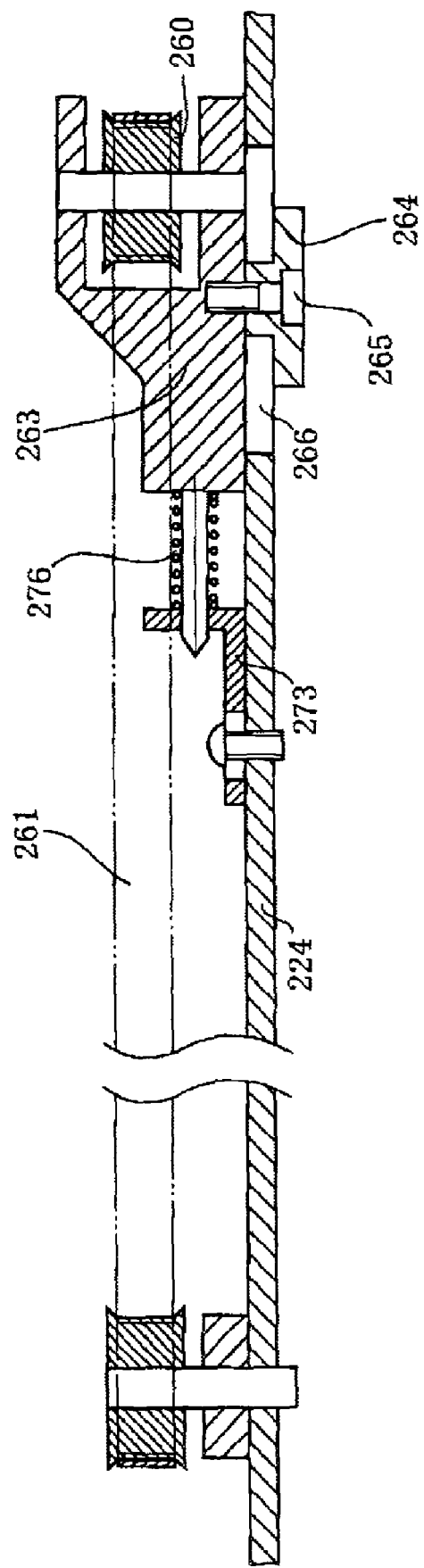
FIG. 16 is a cross-sectional view of a carriage driving apparatus of an image reading apparatus according to a fifth embodiment of the invention.

As shown in FIG. 16, in the fifth embodiment a helical compression spring 276 is used as a biaser or an elastic member, in place of the torsion coil spring 75 used in the first through fourth embodiments. That is, a pulley holder 263 is disposed on a chassis frame or a base 224 of the image reading apparatus such that the pulley holder 263 is slidable along a guiding slot 266, and the helical compression spring 276 is interposed between the pulley holder 263 and a guide 273 that serves to retain the compression spring 276 and is screwed to the base 224, in order to bias the pulley holder 263 with a biasing force of the spring 276 in a direction to tension a timing belt 261. Reference numeral 265 denotes a bolt that secures a part 264 to the pulley holder 263 in order that the pulley holder 263 becomes slidable relative to the base 224 along the guiding slot 266. The helical compression spring 276 is disposed such that even when the helical compression spring 276 is compressed to the maximum, as shown in FIG. 17, a timing belt 261 does not disengage from a driven pulley 260 held by the pulley holder 263.

The present carriage driving apparatus may be assembled in one of the following two ways.

The first way is such that: the pulley holder 263 is first assembled to the base 224; then, while the pulley holder 263 is held at a position on the side to slacken the timing belt 261 (i.e., the position shown in FIG. 17), the timing belt 261 is wound around the driven pulley 260 as held by the pulley holder 263; thereafter, the guide 273 and the helical compression spring 276 are attached such that the helical compression spring 276 is interposed between the guide 273 and the pulley holder 263, in order to establish a state where the pulley holder 263 is biased in the direction to tension the timing belt 261 by the biasing force of the helical compression spring 276 and disengagement of the timing belt 261 from the driven pulley 260 is inhibited, i.e., the state shown in FIG. 16.

Figure 17:
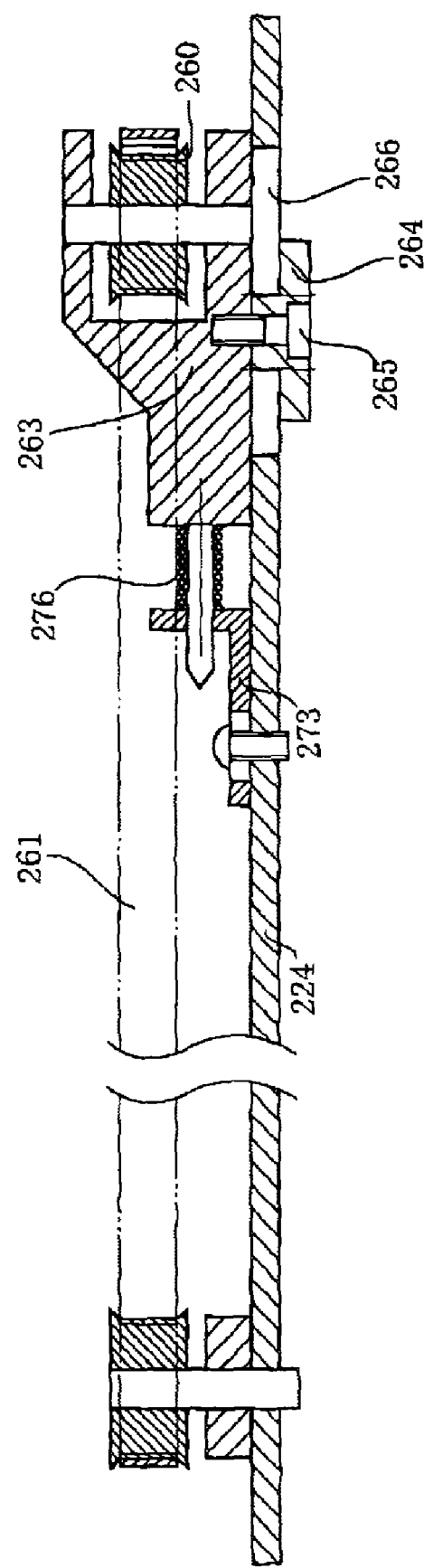
FIG. 17 is another cross-sectional view of the carriage driving apparatus in a state where a helical compression spring is compressed to the maximum.

The second way is such that: the pulley holder 263 is first assembled to the base 224; then, the guide 273 and the helical compression spring 276 are attached such that the helical compression spring 276 is interposed between the guide 273 and the pulley holder 263, in order to establish a state where the pulley holder is biased rightward as seen in FIG. 16 by the biasing force of the spring 276; thereafter, the pulley holder 263 is moved leftward to a position to compress the helical compression spring 276 to the maximum (as shown in FIG. 17) against the biasing force of the helical compression spring 276; while holding the pulley holder 263 at this position to compress the spring 276, the timing belt 261 is forcibly wound around the driven pulley 260 by applying to the timing belt 261 a relatively large tensile force in a tensioning direction. Once the carriage driving apparatus has been assembled in this way, such a large tensile force in the tensioning direction that enables disengagement of the timing belt 261 from the driven pulley 260 is not naturally applied to the timing belt 261, unless intentionally applied by a user or others. Hence, even when the pulley holder 263 is moved to the position to compress the spring 276 to the maximum, the timing belt 261 does not disengage from the driven pulley 260.

In the fifth embodiment, the guide 273 and the helical compression spring 276 are adjustable in position in the sliding direction of the pulley holder 263 in order to adjust a disengagement inhibit position, namely, the position where further movement of the pulley holder in a direction to slacken the timing belt 61 becomes impossible. In a case where the adjustment of the disengagement inhibit position is not unnecessary, the guide 273 may be formed integrally with the base 224.

It is to be understood that although the several embodiments have been described above by way of example, the invention is not limited to the details of the embodiments, but may be embodied otherwise with various modifications and improvements that may occur to those skilled in the art without departing from the scope and spirit of the invention.

What is claimed is:

1. A carriage driving apparatus for reciprocating, along a straight line, a carriage by a timing belt wound around at least a drive pulley and a driven pulley, the apparatus comprising:
a pulley holder which holds the driven pulley such that the driven pulley is rotatable;
a guide device which guides the pulley holder such that the pulley holder is movable at least between a slackening position where engagement and disengagement of the timing belt with and from the driven pulley is allowed, and a tensioning position where the timing belt is tensioned;
a biaser which contacts and biases the pulley holder in a tensioning direction to tension the timing belt; and
a biaser holder which holds the biaser and limits the biaser from deforming in a counter-tensioning direction opposite to the tensioning direction,
wherein the biaser, the biaser holder and the pulley holder are positioned such that the biaser, which is limited from deforming in the counter-tensioning direction, limits the pulley holder from moving, in a counter-tensioning direction, over a disengagement inhibit position between the slackening position and the tensioning position, and
wherein the biaser includes an end portion which is brought into contact with the pulley holder and an elastic portion which gives the end portion a biasing force in the tensioning direction, and the biaser holder includes a restrictor with which the end portion is brought into contact such that the end portion is limited from moving, in the counter-tensioning direction, over the disengagement inhibit position.

2. The carriage driving apparatus according to claim 1, wherein the end portion includes an operating arm which is swingable around an axis intersecting substantially at right angles a guiding direction in which the pulley holder is moved under guidance by the guide device, and has a first portion which is remote from the axis and at which the operating arm engages with the pulley holder,
wherein the elastic portion gives the operating arm a biasing force to swing the operating arm in a direction to tension the timing belt, and
wherein the restrictor determines the disengagement inhibit position by limiting swing of the operating arm.

3. The carriage driving apparatus according to claim 2, wherein the restrictor is disposed on a side of the pulley holder opposite to the axis.

4. The carriage driving apparatus according to claim 2, wherein the restrictor has a cutout which receives a second portion of the operating arm which is remote from the axis, the limit of swinging movement of the operating arm being determined by contact between a bottom portion of the cutout and the second portion of the operating arm.

5. The carriage driving apparatus according to claim 2, wherein the biaser comprises a torsion coil spring which includes:
a coil portion where an elastic wire material is coiled; and
a first arm and a second arm that respectively extend from opposite ends of the coil portion,
wherein the biaser holder includes:
a base;
the restrictor fixedly disposed on the base;
a spring supporter which stands from the base and on which the coil portion is loosely fitted;

a first engaging portion which is disposed on the pulley holder and engages with the first arm; and
a second engaging portion which is disposed on the base and engages with the second arm,
wherein the restrictor engages with the first arm,
wherein the first arm constitutes the operating arm, and
wherein the coil portion constitutes the elastic portion.

6. The carriage driving apparatus according to claim 5, wherein the spring supporter has a disengagement preventer which engages with an end of the coil portion remote from the base in order to prevent disengagement of the coil portion from the spring supporter.

7. The carriage driving apparatus according to claim 6, wherein the disengagement preventer has dimensions that allow the fitting of the coil portion on the spring supporter, by attaching the coil portion in a direction toward the base.

8. The carriage driving apparatus according to claim 5, wherein the spring supporter has an external dimension smaller than an internal dimension of the coil portion, and has an engaging groove extending along at least a part of an outer circumferential surface of the spring supporter such that a limit of movement of the coil portion in a direction perpendicular to a surface of the base is determined by the coil portion fitted in the engaging groove.

9. The carriage driving apparatus according to claim 2, wherein the biaser holder includes a base,
wherein the guiding direction is parallel to the straight line along which the carriage is reciprocated,
wherein the restrictor protrudes from the base to a position near a moving path of the carriage, and
wherein the restrictor has a slant surface which is formed at at least one of opposite ends, in a direction of the straight line, of a protruding end portion of the restrictor, such that the slant surface is inclined in a direction away from the base toward the other end of the protruding end portion.

10. The carriage driving apparatus according to claim 1,
wherein the elastic portion includes an elastic member which is elastically deformable,
and wherein the restrictor limits elastic deformation of the elastic member which accords to movement of the pulley holder in the counter-tensioning direction, to the disengagement inhibit position.

11. The carriage driving apparatus according to claim 10,
wherein the elastic member is a helical compression spring, and
wherein the biaser holder holds the helical compression spring at a position such that when the helical compression spring is tightly compressed and elastic deformation of the helical compression spring becomes maximal, the pulley holder reaches the disengagement inhibit position.

12. The carriage driving apparatus according to claim 1,
wherein the guide device includes:
a base;
an external guide which is disposed on one of the base and the pulley holder, and includes:
a leg having a width; and
a head which is continuous with a free end of the leg, and has a width larger than the width of the leg;
an internal guide which is disposed on the other of the base and the pulley holder, and includes:
a guiding slot which has a width larger than the width of the leg of the external guide, but smaller than the width of the head; and
a wide-open portion which is continuous with an end of the guiding slot, and has a width larger than the width of the head in order to allow passing of the head through the wide-open portion, and
wherein the head as passed through the wide-open portion of the internal guide engages with widthwise opposite ends of the guiding slot by relative movement between the pulley holder and the base along a direction of extension of the guiding slot, in order to prevent the pulley holder from getting off of the base.

13. The carriage driving apparatus according to claim 12, wherein the wide-open portion is located to the tensioning side of the guiding slot.

14. The carriage driving apparatus according to claim 12, wherein the pulley holder includes a rectangular hole which has a width identical with the width of the wide-open portion, and in which a pair of ribs protrude toward each other respectively from lower portions of side wall surfaces of the rectangular hole that are opposed to each other, such that a clearance between opposed end surfaces of the ribs constitutes the guiding slot.

15. The carriage driving apparatus according to claim 12, wherein the leg of the external guide has two side surfaces parallel to each other, and two side surfaces of the guiding slot of the internal guide, that are opposed to each other, guide the side surfaces of the leg, thereby determining a moving direction in which the pulley holder moves.

16. The carriage driving apparatus according to claim 12, wherein the external guide is formed integrally with the base.

17. The carriage driving apparatus according to claim 12, wherein the guide device includes a fitting protrusion and a fitting recess that are engageable with each other in a direction parallel to a moving direction in which the pulley holder moves, and the fitting protrusion and the fitting recess are disposed in the pulley holder and the base, respectively, at a position remote from the external guide in the moving direction.

18. The carriage driving apparatus according to claim 2, wherein the biaser holder includes a base, and the restrictor is formed integrally with the base.

19. An image reading apparatus comprising:
the carriage driving apparatus according to claim 1;
the carriage; and
an image reading head mounted on the carriage.

20. A method of producing the carriage driving apparatus according to claim 1, comprising:
assembling the pulley holder to the guide device;
installing the timing belt to be wound around the driven pulley held by the pulley holder without installing the biaser, while the pulley holder is at the slackening position; and
installing the biaser to be held by the biaser holder after installing the timing belt, so that the pulley holder is biased in the tensioning direction by the end portion, included in the biaser, which is brought into contact with the pulley holder and which is limited from moving in the counter-tensioning direction by being brought into contact with the restrictor included in the biaser holder while inhibited from moving in the counter-tensioning direction further than the disengagement inhibit position.

* * * * *